(12) United States Patent
Zaloum et al.

(10) Patent No.: US 11,606,353 B2
(45) Date of Patent: Mar. 14, 2023

(54) SYSTEM, DEVICE, AND METHOD OF GENERATING AND UTILIZING ONE-TIME PASSWORDS

(71) Applicant: BioCatch Ltd., Tel Aviv (IL)

(72) Inventors: Alexander Basil Zaloum, Boston, MA (US); Alesis Novik, London (GB); Avi Turgeman, New York, NY (US)

(73) Assignee: BIOCATCH LTD., Tel Aviv (IL)

( * ) Notice: Subject to any disclaimer, the term of this patent is extended or adjusted under 35 U.S.C. 154(b) by 0 days.

(21) Appl. No.: 17/382,388

(22) Filed: Jul. 22, 2021

(65) Prior Publication Data

US 2023/0029152 A1  Jan. 26, 2023

(51) Int. Cl.
*H04L 9/40* (2022.01)
*G06F 21/46* (2013.01)
(Continued)

(52) U.S. Cl.
CPC .......... *H04L 63/0838* (2013.01); *G06F 21/46* (2013.01); *H04L 51/42* (2022.05); *H04L 51/58* (2022.05)

(58) Field of Classification Search
CPC ..... H04L 63/0838; H04L 51/58; H04L 51/42; G06F 21/46
See application file for complete search history.

(56) References Cited

U.S. PATENT DOCUMENTS 3,618,019 A  11/1971  Nemirovsky
3,699,517 A  10/1972  Dyche
(Continued)

FOREIGN PATENT DOCUMENTS

EP  2410450 A1  1/2012
EP  2477136 A1  7/2012
(Continued)

OTHER PUBLICATIONS

Faisal Alkhateeb et al., "Bank Web Sites Phishing Detection and Notification System Based on Semantic Web technologies", International Journal of Security and its Applications 6(4):53-66, Oct. 2012.

(Continued)

*Primary Examiner* — Ryan J Jakovac
(74) *Attorney, Agent, or Firm* — Browdy and Neimark, PLLC

(57) ABSTRACT

System, device, and method of generating and utilizing one-time passwords. A method generates a particular One-Time Password (OTP) string that is based on pre-defined OTP string construction rules. The particular OTP string is not a purely-random string; rather, the particular non-purely-random OTP string provides to a behavioral monitoring unit a capability to extract user-specific behavioral typing patterns from a way in which a user types characters of the particular OTP via a keyboard of an electronic device. The method sends the particular OTP string to the user; monitors the way that the user types the OTP string; extracts from the user interactions, that were performed while the user entered the OTP string, a user-specific behavioral typing characteristic; and based on that user-specific characteristic, determines whether that user is authenticated or non-authenticated, and optionally activates fraud mitigation operations or transaction blocking operations if the user is non-authenticated.

20 Claims, 3 Drawing Sheets

(51) Int. Cl.
    *H04L 51/42*    (2022.01)
    *H04L 51/58*    (2022.01)

(56) References Cited

U.S. PATENT DOCUMENTS

| | | | |
|---|---|---|---|
| 3,983,535 A | 9/1976 | Herbst |
| 4,128,829 A | 12/1978 | Herbst |
| 4,621,334 A | 11/1986 | Garcia |
| 4,760,386 A | 7/1988 | Heath |
| 4,805,222 A | 2/1989 | Young |
| 5,305,238 A | 4/1994 | Starr |
| 5,442,342 A | 8/1995 | Kung |
| 5,485,171 A | 1/1996 | Copper |
| 5,557,686 A | 9/1996 | Brown |
| 5,565,657 A | 10/1996 | Merz |
| 5,581,261 A | 12/1996 | Hickman |
| 5,838,306 A | 11/1998 | O'Connor |
| 5,874,941 A | 2/1999 | Yamada |
| 5,999,162 A | 12/1999 | Takahashi |
| 6,028,271 A | 2/2000 | Gillespie |
| 6,202,023 B1 | 3/2001 | Hancock |
| 6,209,102 B1 | 3/2001 | Hoover |
| 6,337,686 B2 | 1/2002 | Wong |
| 6,337,919 B1 | 1/2002 | Dunton |
| 6,442,692 B1 | 8/2002 | Zilberman |
| 6,572,014 B1 | 6/2003 | Lambert |
| 6,743,022 B1 | 6/2004 | Sarel |
| 6,819,219 B1 | 11/2004 | Bolle |
| 6,836,554 B1 | 12/2004 | Bolle |
| 6,895,514 B1 | 5/2005 | Kermani |
| 6,931,131 B1 | 8/2005 | Becker |
| 6,938,061 B1 | 8/2005 | Rumynin |
| 6,938,159 B1 | 8/2005 | O'Connor |
| 6,957,185 B1 | 10/2005 | Labaton |
| 6,957,186 B1 | 10/2005 | Guheen |
| 6,983,061 B2 | 1/2006 | Ikegami |
| 7,092,926 B2 | 8/2006 | Cerrato |
| 7,130,452 B2 | 10/2006 | Bolle |
| 7,133,792 B2 | 11/2006 | Murakami |
| 7,139,916 B2 | 11/2006 | Billingsley |
| 7,158,118 B2 | 1/2007 | Liberty |
| 7,236,156 B2 | 6/2007 | Liberty |
| 7,245,218 B2 | 7/2007 | Ikehara |
| 7,366,919 B1 | 4/2008 | Sobel |
| 7,395,436 B1 | 7/2008 | Nemovicher |
| 7,494,061 B2 | 2/2009 | Reinhold |
| 7,523,191 B1 | 4/2009 | Thomas |
| 7,535,456 B2 | 5/2009 | Liberty |
| 7,606,915 B1 | 10/2009 | Calinov |
| 7,796,013 B2 | 9/2010 | Murakami |
| 7,815,106 B1 | 10/2010 | McConnell |
| 7,818,290 B2 | 10/2010 | Davis |
| 7,860,870 B2 | 12/2010 | Sadagopan |
| 8,031,175 B2 | 10/2011 | Rigazio |
| 8,065,624 B2 | 11/2011 | Morin |
| 8,125,312 B2 | 2/2012 | Orr |
| 8,156,324 B1 | 4/2012 | Shnowske |
| 8,170,953 B1 | 5/2012 | Tullis |
| 8,171,085 B1 | 5/2012 | Tevanian, Jr. |
| 8,201,222 B2 | 6/2012 | Inoue |
| 8,244,211 B2 | 8/2012 | Clark |
| 8,285,658 B1 | 10/2012 | Kellas-Dicks |
| 8,402,533 B2 | 3/2013 | LeBeau |
| 8,417,960 B2 | 4/2013 | Takahashi |
| 8,433,785 B2 | 4/2013 | Awadallah |
| 8,449,393 B2 | 5/2013 | Sobel |
| 8,499,245 B1 | 7/2013 | Froment |
| 8,510,113 B1 | 8/2013 | Conkie |
| 8,548,208 B2 | 10/2013 | Schultz |
| 8,549,629 B1 | 10/2013 | Mccreesh |
| 8,555,077 B2 | 10/2013 | Davis |
| 8,621,209 B1 | 12/2013 | Johansson |
| 8,745,729 B2 | 6/2014 | Poluri |
| 8,788,838 B1 | 8/2014 | Fadell |
| 8,803,797 B2 | 8/2014 | Scott |
| 8,819,812 B1 | 8/2014 | Weber |
| 8,832,823 B2 | 9/2014 | Boss |
| 8,838,060 B2 | 9/2014 | Walley |
| 8,880,441 B1 | 11/2014 | Chen |
| 8,898,787 B2 | 11/2014 | Thompson |
| 8,904,479 B1 | 12/2014 | Johansson |
| 8,938,787 B2 | 1/2015 | Turgeman |
| 8,941,466 B2 | 1/2015 | Bayram |
| 8,990,959 B2 | 3/2015 | Zhu |
| 9,069,942 B2 | 6/2015 | Turgeman |
| 9,071,969 B2 | 6/2015 | Turgeman |
| 9,154,534 B1 | 10/2015 | Gayles |
| 9,174,123 B2 | 11/2015 | Nasiri |
| 9,195,351 B1 | 11/2015 | Rosenberg |
| 9,203,860 B1 | 12/2015 | Casillas |
| 9,275,337 B2 | 3/2016 | Turgeman |
| 9,282,112 B2 | 3/2016 | Filatov |
| 9,301,140 B1 | 3/2016 | Costigan |
| 9,304,915 B2 | 4/2016 | Adams |
| 9,355,231 B2 | 5/2016 | Disraeli |
| 9,355,234 B1 | 5/2016 | Magi Shaashua |
| 9,418,221 B2 | 8/2016 | Turgeman |
| 9,430,629 B1 | 8/2016 | Ziraknejad |
| 9,450,971 B2 | 9/2016 | Turgeman |
| 9,477,826 B2 | 10/2016 | Turgeman |
| 9,483,292 B2 | 11/2016 | Turgeman |
| 9,526,006 B2 | 12/2016 | Turgeman |
| 9,529,987 B2 | 12/2016 | Deutschmann |
| 9,531,701 B2 | 12/2016 | Turgeman |
| 9,531,733 B2 | 12/2016 | Turgeman |
| 9,536,071 B2 | 1/2017 | Turgeman |
| 9,541,995 B2 | 1/2017 | Turgeman |
| 9,547,766 B2 | 1/2017 | Turgeman |
| 9,552,470 B2 | 1/2017 | Turgeman |
| 9,558,339 B2 | 1/2017 | Turgeman |
| 9,589,120 B2 | 3/2017 | Samuel |
| 9,621,567 B2 | 4/2017 | Turgeman |
| 9,626,677 B2 | 4/2017 | Turgeman |
| 9,654,485 B1 | 5/2017 | Neumann |
| 9,665,703 B2 | 5/2017 | Turgeman |
| 9,674,218 B2 | 6/2017 | Turgeman |
| 9,690,915 B2 | 6/2017 | Turgeman |
| 9,703,953 B2 | 7/2017 | Turgeman |
| 9,710,316 B1 | 7/2017 | Chheda |
| 9,712,558 B2 | 7/2017 | Turgeman |
| 9,747,436 B2 | 8/2017 | Turgeman |
| 9,779,423 B2 | 10/2017 | Turgeman |
| 9,832,192 B2 | 11/2017 | Alonso Cebrian |
| 9,838,373 B2 | 12/2017 | Turgeman |
| 9,848,009 B2 | 12/2017 | Turgeman |
| 9,927,883 B1 | 3/2018 | Lin |
| 10,032,010 B2 | 7/2018 | Turgeman |
| 10,037,421 B2 | 7/2018 | Turgeman |
| 10,049,209 B2 | 8/2018 | Turgeman |
| 10,055,560 B2 | 8/2018 | Turgeman |
| 10,069,837 B2 | 9/2018 | Turgeman |
| 10,069,852 B2 | 9/2018 | Turgeman |
| 10,079,853 B2 | 9/2018 | Turgeman |
| 10,083,439 B2 | 9/2018 | Turgeman |
| 10,164,985 B2 | 12/2018 | Turgeman |
| 10,198,122 B2 | 2/2019 | Turgeman |
| 10,235,507 B1 * | 3/2019 | Rome ............... G06F 21/46 |
| 10,262,324 B2 | 4/2019 | Turgeman |
| 10,298,614 B2 | 5/2019 | Turgeman |
| 10,395,018 B2 | 8/2019 | Turgeman |
| 10,397,262 B2 | 8/2019 | Karabchevsky |
| 10,404,729 B2 | 9/2019 | Turgeman |
| 10,474,815 B2 | 11/2019 | Turgeman |
| 10,476,873 B2 | 11/2019 | Turgeman |
| 10,523,680 B2 | 12/2019 | Turgeman |
| 10,579,784 B2 | 3/2020 | Turgeman |
| 10,586,036 B2 | 3/2020 | Turgeman |
| 10,621,585 B2 | 4/2020 | Turgeman |
| 10,685,355 B2 | 6/2020 | Novick |
| 10,719,765 B2 | 7/2020 | Novik |
| 10,728,761 B2 | 7/2020 | Kedem |
| 10,747,305 B2 | 8/2020 | Turgeman |
| 10,776,476 B2 | 9/2020 | Turgeman |
| 10,834,090 B2 | 11/2020 | Turgeman |

(56) References Cited

U.S. PATENT DOCUMENTS

| | | |
|---|---|---|
| 10,834,590 B2 | 11/2020 | Turgeman |
| 10,897,482 B2 | 1/2021 | Rivner |
| 10,917,431 B2 | 2/2021 | Turgeman |
| 10,949,514 B2 | 3/2021 | Turgeman |
| 10,949,757 B2 | 3/2021 | Turgeman |
| 10,970,394 B2 | 4/2021 | Kedem |
| 11,055,395 B2 | 7/2021 | Novik |
| 2001/0004733 A1 | 6/2001 | Eldering |
| 2002/0023229 A1 | 2/2002 | Hangai |
| 2002/0089412 A1 | 7/2002 | Heger |
| 2003/0033526 A1 | 2/2003 | French |
| 2003/0074201 A1 | 4/2003 | Grashey |
| 2003/0137494 A1 | 7/2003 | Tulbert |
| 2003/0149803 A1 | 8/2003 | Wilson |
| 2003/0212811 A1 | 11/2003 | Thornton |
| 2004/0015714 A1 | 1/2004 | Abraham |
| 2004/0017355 A1 | 1/2004 | Shim |
| 2004/0021643 A1 | 2/2004 | Hoshino |
| 2004/0034784 A1 | 2/2004 | Fedronic |
| 2004/0062423 A1 | 4/2004 | Doi |
| 2004/0111523 A1 | 6/2004 | Hall |
| 2004/0123156 A1 | 6/2004 | Hammond |
| 2004/0128240 A1 | 7/2004 | Yusin |
| 2004/0143737 A1 | 7/2004 | Teicher |
| 2004/0186882 A1 | 9/2004 | Ting |
| 2004/0187037 A1 | 9/2004 | Checco |
| 2004/0221171 A1 | 11/2004 | Ahmed |
| 2005/0008148 A1 | 1/2005 | Jacobson |
| 2005/0060138 A1 | 3/2005 | Wang |
| 2005/0179657 A1 | 8/2005 | Russo |
| 2005/0289264 A1 | 12/2005 | Illowsky |
| 2006/0006803 A1 | 1/2006 | Huang |
| 2006/0080263 A1 | 4/2006 | Willis |
| 2006/0090073 A1 | 4/2006 | Steinberg |
| 2006/0123101 A1 | 6/2006 | Buccella |
| 2006/0143454 A1 | 6/2006 | Walmsley |
| 2006/0195328 A1 | 8/2006 | Abraham |
| 2006/0215886 A1 | 9/2006 | Black |
| 2006/0224898 A1 | 10/2006 | Ahmed |
| 2006/0238490 A1 | 10/2006 | Stanley |
| 2006/0239430 A1 | 10/2006 | Gue |
| 2006/0280339 A1 | 12/2006 | Cho |
| 2006/0282660 A1 | 12/2006 | Varghese |
| 2006/0284969 A1 | 12/2006 | Kim |
| 2006/0287079 A1 | 12/2006 | Nonaka |
| 2007/0118804 A1 | 5/2007 | Raciborski |
| 2007/0156443 A1 | 7/2007 | Gurvey |
| 2007/0174082 A1 | 7/2007 | Singh |
| 2007/0183633 A1 | 8/2007 | Hoffmann |
| 2007/0198286 A1 | 8/2007 | Tomita |
| 2007/0214426 A1 | 9/2007 | Ruelle |
| 2007/0226797 A1 | 9/2007 | Thompson |
| 2007/0236330 A1 | 10/2007 | Cho |
| 2007/0240230 A1 | 10/2007 | O'Connell |
| 2007/0241861 A1 | 10/2007 | Venkatanna |
| 2007/0250920 A1 | 10/2007 | Lindsay |
| 2007/0255821 A1 | 11/2007 | Ge |
| 2007/0266305 A1 | 11/2007 | Cong |
| 2007/0271466 A1 | 11/2007 | Mak |
| 2007/0283416 A1 | 12/2007 | Renaud |
| 2008/0046982 A1 | 2/2008 | Parkinson |
| 2008/0059474 A1 | 3/2008 | Lim |
| 2008/0066167 A1 | 3/2008 | Andri |
| 2008/0068343 A1 | 3/2008 | Hoshino |
| 2008/0084972 A1 | 4/2008 | Burke |
| 2008/0091453 A1 | 4/2008 | Meehan |
| 2008/0091639 A1 | 4/2008 | Davis |
| 2008/0092209 A1 | 4/2008 | Davis |
| 2008/0092245 A1 | 4/2008 | Alward |
| 2008/0097851 A1 | 4/2008 | Bemmel |
| 2008/0098456 A1 | 4/2008 | Alward |
| 2008/0120717 A1 | 5/2008 | Shakkarwar |
| 2008/0136790 A1 | 6/2008 | Hio |
| 2008/0162449 A1 | 7/2008 | Chao-Yu |
| 2008/0183745 A1 | 7/2008 | Cancel |
| 2008/0192005 A1 | 8/2008 | Elgoyhen |
| 2008/0200310 A1 | 8/2008 | Tagliabue |
| 2008/0211766 A1 | 9/2008 | Westerman |
| 2008/0215576 A1 | 9/2008 | Zhao |
| 2008/0263636 A1 | 10/2008 | Gusler |
| 2008/0298588 A1 | 12/2008 | Shakkarwar |
| 2008/0301808 A1 | 12/2008 | Calo |
| 2008/0306897 A1 | 12/2008 | Liu |
| 2008/0307236 A1 | 12/2008 | Lu |
| 2008/0309616 A1 | 12/2008 | Massengill |
| 2008/0319841 A1 | 12/2008 | Oliver |
| 2009/0037983 A1 | 2/2009 | Chiruvolu |
| 2009/0038010 A1 | 2/2009 | Ma |
| 2009/0049555 A1 | 2/2009 | Cho |
| 2009/0083850 A1 | 3/2009 | Fadell |
| 2009/0089879 A1 | 4/2009 | Wang |
| 2009/0094311 A1 | 4/2009 | Awadallah |
| 2009/0132395 A1 | 5/2009 | Lam |
| 2009/0133106 A1 | 5/2009 | Bentley |
| 2009/0134972 A1 | 5/2009 | Wu, Jr. |
| 2009/0157792 A1 | 6/2009 | Fiatal |
| 2009/0172551 A1 | 7/2009 | Kane |
| 2009/0177562 A1 | 7/2009 | Peace |
| 2009/0189736 A1 | 7/2009 | Hayashi |
| 2009/0199296 A1 | 8/2009 | Xie |
| 2009/0203355 A1 | 8/2009 | Clark |
| 2009/0227232 A1 | 9/2009 | Matas |
| 2009/0241188 A1 | 9/2009 | Komura |
| 2009/0254336 A1 | 10/2009 | Dumais |
| 2009/0281979 A1 | 11/2009 | Tysowski |
| 2009/0293119 A1 | 11/2009 | Jonsson |
| 2009/0299967 A1 | 12/2009 | Li |
| 2009/0300589 A1 | 12/2009 | Watters |
| 2009/0303204 A1 | 12/2009 | Nasiri |
| 2009/0320123 A1 | 12/2009 | Yu |
| 2010/0007632 A1 | 1/2010 | Yamazaki |
| 2010/0040293 A1 | 2/2010 | Hermann |
| 2010/0042387 A1 | 2/2010 | Gibbon |
| 2010/0042403 A1 | 2/2010 | Chandrasekar |
| 2010/0042954 A1 | 2/2010 | Rosenblatt |
| 2010/0046806 A1 | 2/2010 | Baughman |
| 2010/0070405 A1 | 3/2010 | Joa |
| 2010/0077470 A1 | 3/2010 | Kozat |
| 2010/0082747 A1 | 4/2010 | Yue |
| 2010/0082998 A1 | 4/2010 | Kohavi |
| 2010/0097324 A1 | 4/2010 | Anson |
| 2010/0115610 A1 | 5/2010 | Tredoux |
| 2010/0122082 A1 | 5/2010 | Deng |
| 2010/0125816 A1 | 5/2010 | Bezos |
| 2010/0138370 A1 | 6/2010 | Wu |
| 2010/0164897 A1 | 7/2010 | Morin |
| 2010/0171753 A1 | 7/2010 | Kwon |
| 2010/0197352 A1 | 8/2010 | Runstedler |
| 2010/0203876 A1 | 8/2010 | Krishnaswamy |
| 2010/0225443 A1 | 9/2010 | Bayram |
| 2010/0245553 A1 | 9/2010 | Schuler |
| 2010/0269165 A1 | 10/2010 | Chen |
| 2010/0281539 A1 | 11/2010 | Burns |
| 2010/0284532 A1 | 11/2010 | Burnett |
| 2010/0287229 A1 | 11/2010 | Hauser |
| 2010/0321304 A1 | 12/2010 | Rofougaran |
| 2010/0325721 A1 | 12/2010 | Bandyopadhyay |
| 2010/0328074 A1 | 12/2010 | Johnson |
| 2011/0010209 A1 | 1/2011 | McNally |
| 2011/0012829 A1 | 1/2011 | Yao |
| 2011/0016320 A1 | 1/2011 | Bergsten |
| 2011/0016534 A1 | 1/2011 | Jakobsson |
| 2011/0018828 A1 | 1/2011 | Wu |
| 2011/0023115 A1 | 1/2011 | Wright |
| 2011/0029902 A1 | 2/2011 | Bailey |
| 2011/0039529 A1 | 2/2011 | Kim |
| 2011/0039602 A1 | 2/2011 | McNamara |
| 2011/0043475 A1 | 2/2011 | Rigazio |
| 2011/0050394 A1 | 3/2011 | Zhang |
| 2011/0055077 A1 | 3/2011 | French |
| 2011/0063211 A1 | 3/2011 | Hoerl |
| 2011/0065504 A1 | 3/2011 | Dugan |
| 2011/0066682 A1 | 3/2011 | Aldunate |
| 2011/0082768 A1 | 4/2011 | Eisen |

(56) References Cited

U.S. PATENT DOCUMENTS

| | | |
|---|---|---|
| 2011/0102570 A1 | 5/2011 | Wilf |
| 2011/0105103 A1 | 5/2011 | Ullrich |
| 2011/0105859 A1 | 5/2011 | Popovic |
| 2011/0113388 A1 | 5/2011 | Eisen |
| 2011/0119370 A1 | 5/2011 | Huang |
| 2011/0134240 A1 | 6/2011 | Anderson |
| 2011/0154273 A1 | 6/2011 | Aburada |
| 2011/0154497 A1 | 6/2011 | Bailey |
| 2011/0159650 A1 | 6/2011 | Shiraishi |
| 2011/0159850 A1 | 6/2011 | Faith |
| 2011/0162076 A1 | 6/2011 | Song |
| 2011/0191820 A1 | 8/2011 | Ivey |
| 2011/0193737 A1 | 8/2011 | Chiueh |
| 2011/0196791 A1 | 8/2011 | Dominguez |
| 2011/0202453 A1 | 8/2011 | Issa |
| 2011/0221684 A1 | 9/2011 | Rydenhag |
| 2011/0223888 A1 | 9/2011 | Esaki |
| 2011/0225644 A1 | 9/2011 | Pullikottil |
| 2011/0246902 A1 | 10/2011 | Tsai |
| 2011/0248941 A1 | 10/2011 | Abdo |
| 2011/0251823 A1 | 10/2011 | Davis |
| 2011/0271342 A1 | 11/2011 | Chung |
| 2011/0276414 A1 | 11/2011 | Subbarao |
| 2011/0286730 A1 | 11/2011 | Gallagher |
| 2011/0300831 A1 | 12/2011 | Chin |
| 2011/0304531 A1 | 12/2011 | Brooks |
| 2011/0320822 A1 | 12/2011 | Lind |
| 2012/0005483 A1 | 1/2012 | Patvarczki |
| 2012/0005719 A1 | 1/2012 | McDougal |
| 2012/0007821 A1 | 1/2012 | Zaliva |
| 2012/0054834 A1 | 3/2012 | King |
| 2012/0072982 A1 | 3/2012 | Ranganathan |
| 2012/0096555 A1 | 4/2012 | Mahaffey |
| 2012/0101930 A1 | 4/2012 | Li |
| 2012/0102551 A1 | 4/2012 | Bidare |
| 2012/0113061 A1 | 5/2012 | Ikeda |
| 2012/0123932 A1 | 5/2012 | LeCuyer |
| 2012/0124662 A1 | 5/2012 | Baca |
| 2012/0133055 A1 | 5/2012 | Machida |
| 2012/0151044 A1 | 6/2012 | Luna |
| 2012/0151559 A1 | 6/2012 | Koudys |
| 2012/0154173 A1 | 6/2012 | Chang |
| 2012/0154273 A1 | 6/2012 | McDade |
| 2012/0154823 A1 | 6/2012 | Sakamoto |
| 2012/0158503 A1 | 6/2012 | Mardikar |
| 2012/0159599 A1 | 6/2012 | Szoke |
| 2012/0164978 A1 | 6/2012 | Conti |
| 2012/0167170 A1 | 6/2012 | Shi |
| 2012/0167204 A1 | 6/2012 | Akka |
| 2012/0174213 A1 | 7/2012 | Geiger |
| 2012/0188198 A1 | 7/2012 | Jeong |
| 2012/0204257 A1 | 8/2012 | O'Connell |
| 2012/0218193 A1 | 8/2012 | Weber |
| 2012/0239557 A1 | 9/2012 | Weinflash |
| 2012/0246737 A1 | 9/2012 | Paxton |
| 2012/0252410 A1 | 10/2012 | Williams |
| 2012/0278804 A1 | 11/2012 | Narayanasamy |
| 2012/0278886 A1 | 11/2012 | Luna |
| 2012/0284380 A1 | 11/2012 | Anderson |
| 2012/0297476 A1 | 11/2012 | Zeljkovic |
| 2013/0018796 A1 | 1/2013 | Kolhatkar |
| 2013/0024239 A1 | 1/2013 | Baker |
| 2013/0036416 A1 | 2/2013 | Raju |
| 2013/0061169 A1 | 3/2013 | Pearcy |
| 2013/0076650 A1 | 3/2013 | Vik |
| 2013/0088434 A1 | 4/2013 | Masuda |
| 2013/0097682 A1 | 4/2013 | Zeljkovic |
| 2013/0097706 A1 | 4/2013 | Titonis |
| 2013/0109944 A1 | 5/2013 | Sparacino |
| 2013/0111586 A1 | 5/2013 | Jackson |
| 2013/0132091 A1 | 5/2013 | Skerpac |
| 2013/0133055 A1 | 5/2013 | Ali |
| 2013/0135218 A1 | 5/2013 | Jain |
| 2013/0139248 A1 | 5/2013 | Rhee |
| 2013/0154999 A1 | 6/2013 | Guard |
| 2013/0162603 A1 | 6/2013 | Peng |
| 2013/0167212 A1 | 6/2013 | Azar |
| 2013/0173737 A1 | 7/2013 | Liu |
| 2013/0198832 A1 | 8/2013 | Draluk |
| 2013/0212674 A1 | 8/2013 | Boger |
| 2013/0226992 A1 | 8/2013 | Bapst |
| 2013/0237272 A1 | 9/2013 | Prasad |
| 2013/0239195 A1 | 9/2013 | Turgeman |
| 2013/0239206 A1 | 9/2013 | Draluk |
| 2013/0243208 A1 | 9/2013 | Fawer |
| 2013/0254642 A1 | 9/2013 | Seo |
| 2013/0282637 A1 | 10/2013 | Costigan |
| 2013/0288647 A1 | 10/2013 | Turgeman |
| 2013/0301830 A1 | 11/2013 | Bar-El |
| 2013/0305357 A1 | 11/2013 | Ayyagari |
| 2013/0312097 A1 | 11/2013 | Turnbull |
| 2013/0335349 A1 | 12/2013 | Ferren |
| 2013/0346309 A1 | 12/2013 | Giori |
| 2013/0346311 A1 | 12/2013 | Boding |
| 2014/0033317 A1 | 1/2014 | Barber |
| 2014/0041020 A1 | 2/2014 | Zhao |
| 2014/0078061 A1 | 3/2014 | Simons |
| 2014/0078193 A1 | 3/2014 | Barnhoefer |
| 2014/0082369 A1 | 3/2014 | Waclawsky |
| 2014/0111451 A1 | 4/2014 | Park |
| 2014/0114843 A1 | 4/2014 | Klein |
| 2014/0118520 A1 | 5/2014 | Slaby |
| 2014/0123275 A1 | 5/2014 | Azar |
| 2014/0143304 A1 | 5/2014 | Hegarty |
| 2014/0168093 A1 | 6/2014 | Lawrence |
| 2014/0196119 A1 | 7/2014 | Hill |
| 2014/0200953 A1 | 7/2014 | Mun |
| 2014/0223531 A1 | 8/2014 | Outwater |
| 2014/0244499 A1 | 8/2014 | Gruner |
| 2014/0250538 A1 | 9/2014 | Rapaport |
| 2014/0259130 A1 | 9/2014 | Li |
| 2014/0270571 A1 | 9/2014 | Dwan |
| 2014/0283059 A1 | 9/2014 | Sambamurthy |
| 2014/0283068 A1 | 9/2014 | Call |
| 2014/0289833 A1 | 9/2014 | Briceno |
| 2014/0310764 A1 | 10/2014 | Tippett |
| 2014/0310805 A1 | 10/2014 | Kandekar |
| 2014/0317028 A1 | 10/2014 | Turgeman |
| 2014/0317726 A1 | 10/2014 | Turgeman |
| 2014/0317734 A1 | 10/2014 | Valencia |
| 2014/0317744 A1 | 10/2014 | Turgeman |
| 2014/0325223 A1 | 10/2014 | Turgeman |
| 2014/0325645 A1 | 10/2014 | Turgeman |
| 2014/0325646 A1 | 10/2014 | Turgeman |
| 2014/0325682 A1 | 10/2014 | Turgeman |
| 2014/0337786 A1 | 11/2014 | Luo |
| 2014/0344927 A1 | 11/2014 | Turgeman |
| 2015/0002479 A1 | 1/2015 | Kawamura |
| 2015/0012920 A1 | 1/2015 | De Santis |
| 2015/0062078 A1 | 3/2015 | Christman |
| 2015/0081549 A1 | 3/2015 | Kimberg |
| 2015/0091858 A1 | 4/2015 | Rosenberg |
| 2015/0094030 A1 | 4/2015 | Turgeman |
| 2015/0101031 A1 | 4/2015 | Harjanto |
| 2015/0128252 A1 | 5/2015 | Konami |
| 2015/0146945 A1 | 5/2015 | Han |
| 2015/0205944 A1 | 7/2015 | Turgeman |
| 2015/0205955 A1 | 7/2015 | Turgeman |
| 2015/0205957 A1 | 7/2015 | Turgeman |
| 2015/0205958 A1 | 7/2015 | Turgeman |
| 2015/0212843 A1 | 7/2015 | Turgeman |
| 2015/0213244 A1 | 7/2015 | Lymberopoulos |
| 2015/0213245 A1 | 7/2015 | Tartz |
| 2015/0213246 A1 | 7/2015 | Turgeman |
| 2015/0213251 A1 | 7/2015 | Turgeman |
| 2015/0242601 A1 | 8/2015 | Griffiths |
| 2015/0256528 A1 | 9/2015 | Turgeman |
| 2015/0256556 A1 | 9/2015 | Kaminsky |
| 2015/0264572 A1 | 9/2015 | Turgeman |
| 2015/0268768 A1 | 9/2015 | Woodhull |
| 2015/0279155 A1 | 10/2015 | Chun |
| 2015/0310196 A1 | 10/2015 | Turgeman |
| 2015/0348038 A1 | 12/2015 | Femrite |
| 2015/0358317 A1 | 12/2015 | Deutschmann |

(56) References Cited

U.S. PATENT DOCUMENTS

| | | |
|---|---|---|
| 2016/0006800 A1 | 1/2016 | Summers |
| 2016/0012465 A1 | 1/2016 | Sharp |
| 2016/0019546 A1 | 1/2016 | Eisen |
| 2016/0034673 A1 | 2/2016 | Chandra |
| 2016/0042164 A1 | 2/2016 | Goldsmith |
| 2016/0048937 A1 | 2/2016 | Mathura |
| 2016/0055324 A1 | 2/2016 | Agarwal |
| 2016/0057623 A1 | 2/2016 | Dutt |
| 2016/0077620 A1 | 3/2016 | Choi |
| 2016/0087952 A1 | 3/2016 | Tartz |
| 2016/0109969 A1 | 4/2016 | Keating |
| 2016/0132105 A1 | 5/2016 | Turgeman |
| 2016/0155126 A1 | 6/2016 | D'Uva |
| 2016/0164905 A1 | 6/2016 | Pinney Wood |
| 2016/0164906 A1 | 6/2016 | Pinney Wood |
| 2016/0174044 A1 | 6/2016 | Jones |
| 2016/0179245 A1 | 6/2016 | Johansson |
| 2016/0182503 A1 | 6/2016 | Cheng |
| 2016/0191237 A1 | 6/2016 | Roth |
| 2016/0196414 A1 | 7/2016 | Stuntebeck |
| 2016/0197918 A1 | 7/2016 | Turgeman |
| 2016/0209948 A1 | 7/2016 | Tulbert |
| 2016/0226865 A1 | 8/2016 | Chen |
| 2016/0241555 A1 | 8/2016 | Vo |
| 2016/0294837 A1 | 10/2016 | Turgeman |
| 2016/0300049 A1 | 10/2016 | Guedalia |
| 2016/0300054 A1 | 10/2016 | Turgeman |
| 2016/0306974 A1 | 10/2016 | Turgeman |
| 2016/0307191 A1 | 10/2016 | Turgeman |
| 2016/0307201 A1 | 10/2016 | Turgeman |
| 2016/0321445 A1 | 11/2016 | Turgeman |
| 2016/0321689 A1 | 11/2016 | Turgeman |
| 2016/0328572 A1 | 11/2016 | Valacich |
| 2016/0342826 A1 | 11/2016 | Apostolos |
| 2016/0344783 A1 | 11/2016 | Kushimoto |
| 2016/0364138 A1 | 12/2016 | Luo |
| 2016/0366177 A1 | 12/2016 | Turgeman |
| 2016/0371476 A1 | 12/2016 | Turgeman |
| 2017/0011217 A1 | 1/2017 | Turgeman |
| 2017/0012988 A1 | 1/2017 | Turgeman |
| 2017/0017781 A1 | 1/2017 | Turgeman |
| 2017/0032114 A1 | 2/2017 | Turgeman |
| 2017/0034210 A1 | 2/2017 | Talmor |
| 2017/0048272 A1 | 2/2017 | Yamamura |
| 2017/0054702 A1 | 2/2017 | Turgeman |
| 2017/0063858 A1 | 3/2017 | Bandi |
| 2017/0076089 A1 | 3/2017 | Turgeman |
| 2017/0085587 A1 | 3/2017 | Turgeman |
| 2017/0090418 A1 | 3/2017 | Tsang |
| 2017/0091450 A1 | 3/2017 | Turgeman |
| 2017/0126735 A1 | 5/2017 | Turgeman |
| 2017/0127197 A1 | 5/2017 | Mulder |
| 2017/0140279 A1 | 5/2017 | Turgeman |
| 2017/0149958 A1 | 5/2017 | Xian |
| 2017/0154366 A1 | 6/2017 | Turgeman |
| 2017/0177999 A1 | 6/2017 | Novik |
| 2017/0193526 A1 | 7/2017 | Turgeman |
| 2017/0195354 A1 | 7/2017 | Kesin |
| 2017/0195356 A1 | 7/2017 | Turgeman |
| 2017/0221064 A1 | 8/2017 | Turgeman |
| 2017/0302340 A1 | 10/2017 | Berlin |
| 2017/0364674 A1 | 12/2017 | Grubbs |
| 2017/0364919 A1 | 12/2017 | Ranganath |
| 2018/0004948 A1 | 1/2018 | Martin |
| 2018/0012003 A1 | 1/2018 | Asulin |
| 2018/0012227 A1 | 1/2018 | Tunnell |
| 2018/0034850 A1 | 2/2018 | Turgeman |
| 2018/0046792 A1 | 2/2018 | Toqan |
| 2018/0095596 A1 | 4/2018 | Turgeman |
| 2018/0097841 A1 | 4/2018 | Stolarz |
| 2018/0103047 A1 | 4/2018 | Turgeman |
| 2018/0107836 A1 | 4/2018 | Boger |
| 2018/0115899 A1 | 4/2018 | Kedem |
| 2018/0121640 A1 | 5/2018 | Turgeman |
| 2018/0124082 A1 | 5/2018 | Siadati |
| 2018/0160309 A1 | 6/2018 | Turgeman |
| 2018/0183827 A1 | 6/2018 | Zorlular |
| 2018/0302425 A1 | 10/2018 | Esman, Sr. |
| 2018/0314816 A1 | 11/2018 | Turgeman |
| 2018/0349583 A1 | 12/2018 | Turgeman |
| 2018/0350144 A1 | 12/2018 | Rathod |
| 2018/0351959 A1 | 12/2018 | Turgeman |
| 2018/0373780 A1 | 12/2018 | Pascarella |
| 2019/0028497 A1 | 1/2019 | Karabchevsky |
| 2019/0057200 A1 | 2/2019 | Sabag |
| 2019/0121956 A1 | 4/2019 | Turgeman |
| 2019/0124068 A1 | 4/2019 | Anders |
| 2019/0156034 A1 | 5/2019 | Kedem |
| 2019/0158535 A1 | 5/2019 | Kedem |
| 2019/0220863 A1 | 7/2019 | Novick |
| 2019/0236391 A1 | 8/2019 | Novik |
| 2019/0272025 A1 | 9/2019 | Turgeman |
| 2019/0342328 A1 | 11/2019 | Rivner |
| 2019/0342329 A1 | 11/2019 | Turgeman |
| 2020/0012770 A1 | 1/2020 | Turgeman |
| 2020/0045044 A1 | 2/2020 | Turgeman |
| 2020/0076816 A1 | 3/2020 | Turgeman |
| 2020/0234306 A1 | 7/2020 | Turgeman |
| 2020/0273040 A1 | 8/2020 | Novick |
| 2020/0327212 A1 | 10/2020 | Kedem |
| 2020/0327422 A1 | 10/2020 | Novik |
| 2021/0004451 A1 | 1/2021 | Novik |
| 2021/0014236 A1 | 1/2021 | Turgeman |
| 2021/0021997 A1 | 1/2021 | Turgeman |
| 2021/0051172 A1 | 2/2021 | Turgeman |
| 2021/0110014 A1 | 4/2021 | Turgeman |
| 2021/0286870 A1 | 9/2021 | Novik |
| 2022/0253511 A1 * | 8/2022 | Popa ............... H04L 63/0838 |

FOREIGN PATENT DOCUMENTS

| | | | |
|---|---|---|---|
| EP | 2541452 A1 | 1/2013 | |
| EP | 2610776 A2 | 7/2013 | |
| EP | 2871815 A1 | 5/2015 | |
| EP | 2646904 B1 | 8/2018 | |
| EP | 3019991 B1 | 2/2019 | |
| ES | 2338092 A1 | 5/2010 | |
| WO | 2005099166 A2 | 10/2005 | |
| WO | 2007146437 A2 | 12/2007 | |
| WO | 2012/001697 A1 | 1/2012 | |
| WO | 2012073233 A1 | 6/2012 | |
| WO | 2013/161077 A1 | 10/2013 | |
| WO | WO-2013178982 A1 * | 12/2013 | ............ G06F 21/31 |
| WO | 2015/127253 A1 | 8/2015 | |
| WO | 2018/007821 A1 | 1/2018 | |
| WO | 2018/007823 A1 | 1/2018 | |
| WO | 2018/055406 A1 | 3/2018 | |

OTHER PUBLICATIONS

Sungzoon Cho et al., "Artificial Rhythms and Cues for Keystroke Dynamics Based Authentication", International Conference on Biometrics (ICB)—Advances in Biometrics, pp. 626-632, year 2006.

International Search Report for PCT/IB2017/055995, dated Feb. 15, 2018.

Written Opinion of the International Search Authority for PCT/IB2017/055995, dated Feb. 15, 2018.

Supplementary European Search Report for application 11844440 dated Nov. 17, 2017.

International Search Report for application PCT/IB2016/054064 dated Nov. 21, 2016.

International Search Report for application PCT/IB2014/062941 dated Dec. 17, 2014.

International Search Report for application PCT/IB2014/062293 dated Oct. 1, 2014.

International Search Report for application PCT/IL2011/000907 dated Apr. 19, 2012.

Nakkabi et al., "Improving Mouse Dynamics Biometric Performance Using Variance Reduction via Extractors with Separate Features", Nov. 2010, IEEE Transactions on System, Man, and Cybernetics; vol. 40, No. 6.

(56) References Cited

OTHER PUBLICATIONS

Nance et al., "Virtual Machine Introspection", IEEE Security & Privacy, 2008.
Garfinkel and Rosenblum, "A virtual Machine Introspection-Based Architecture for Intrustion Detection.", 2003, Proc. Network and Distributed Systems Security Symp., The Internet Society, pp. 191-206.
Spafford et al., "Software Forensics: Can We Track Code to its Authors?", Feb. 1992, Computer Science Technical Report, Purdue e-Pubs, Report No. CSD-TR-92-010.
Tavis Ormandy, "An Empirical Study into the Security Exposure to Hosts of Hostile Virtualized Environments", retrieved from the Internet on May 3, 2017, from: http://taviso.decsystem.org/virtsec.pdf.
Zheng et al., "An Efficient User Verification System via Mouse Movements", Oct. 17-21, 2011, CCS' 11, Chicago, Illinois.
Liston et al., "On the Cutting Edge: Thwarting Virtual Machine Detection"; retrieved from the Internet on May 3, 2017, from: http://docplayer.net/9791309-On-the-cutting-edge-thwarting-virtual-machine-detection.html.
Georgia Frantzeskou et al., "Identifying Authorship by Byte-Level N-Grams: The source Code Author Profile (SCAP) Method", Spring 2007, International Journal of Digital Evidence, vol. 6, issue 1.
Franklin et al., "Remote Detection of Virtual Machine Monitors with Fuzzy benchmarking", ACM SIGOPS Operating Systems Review, V42, Issue 3, Apr. 2008.
Emmanouil Vasilomanolakis, "A honeypot-driven cyber incident monitor: Lessons learned and steps ahead"; Sep. 2015; SIN '15: Proceedings of the 8th International Conference on Security of Information and Networks; Publisher: ACM; pp. 1-7.
Communication from the European Patent Office (EPO) in EP 14814408, dated Oct. 15, 2019.
Bassam Sayed, "A Static Authentication Framework Based on Mouse Gesture Dynamics", Helwan University, 2003.
Communication from the European Patent Office (EPO) in EP 17739666, dated Jun. 17, 2020.
Communication from the European Patent Office (EPO) in EP 17777357, dated Jul. 23, 2020.
International Search Report (ISR) in PCT/IL2020/050724, dated Sep. 7, 2020.
Written Opinion of the International Searching Authority in PCT/IL2020/050724, dated Sep. 7, 2020.
J. D. Crawford et al., "Spatial Transformations for Eye-Hand Coordination", Journal of Neurophysiology, vol. 92, Issue 1, pp. 10-19, Jul. 2004.
Communication from the European Patent Office (EPO) in patent application No. EP 17739667, dated Oct. 20, 2020.
Machine Translation of patent application No. EP 2338092 A1, Obtained on Jan. 14, 2021 from: https://patents.google.com/patent/EP2338092A1/en.
Asaf Shabtai et al., "Andromaly": a behavioral malware detection framework for android devices, Journal of Intelligent Information Systems, Jan. 6, 2011.
Machine Translation of ES 2338092 A1, Obtained from "Google Patents" on Oct. 10, 2021 from: https://patents.google.com/patent/ES2338092A1/en.
United Kingdom Intellectual Property Office, Examination Report dated Sep. 20, 2021 in patent application No. GB 2006212.1.
BioCatch Ltd., "Social Engineering Attacks: What's Next in Detecting Phishing, Vishing & Smishing", Oct. 19, 2017; Printed on Nov. 5, 2021 from: www.biocatch.com/blog/social-engineering-attacks-whats-next-in-detecting-phishing-vishing-smishing.
Communication from the European Patent Office in patent application EP 14814408, dated Mar. 11, 2021.
International Search Report for PCT international application PCT/IL2018/051246, dated Mar. 11, 2019.
Written Opinion of the International Searching Authority for PCT international application PCT/IL2018/051246, dated Mar. 11, 2019.
Written Opinion of the International Searching Authority for PCT international application PCT/IL2011/000907, dated Apr. 19, 2012.
Written Opinion of the International Searching Authority for PCT international application PCT/IB2014/062293, dated Oct. 1, 2014.
Written Opinion of the International Searching Authority for PCT international application PCT/IB2014/062941, dated Dec. 17, 2014.
Written Opinion of the International Searching Authority for PCT international application PCT/IB2016/054064, dated Jul. 9, 2015.
Syed Ahsan Abbas et al., "What is the difference between a rooted and unrooted Android?" Quora.com, dated Jul. 22, 2016, printed on Aug. 12, 2019 from: www.Quora.com/What-is-the-difference-between-a-rooted-and-unrooted-Android.
Sebastian Lindstrom, "Getting to know asynchronous JavaScript: Callbacks, Promises and Async / Await", Medium.com, dated Jul. 2, 2017, printed on Aug. 12, 2019 from: Medium.com/codebuddies/getting-to-know-asynchronous-javascript-callbacks-promises-and-async-await-17e0673281ee.
Machine translation of WO 2013/161077 A1, "Biometric authentication device, biometric authentication program, and biometric authentication method", Obtained on Jan. 24, 2020 from: https://patents.google.com/patent/WO2013161077A1/en?oq=JP2006277341A.
Oriana Riva et al., "Progressive authentication: Deciding when to authenticate on mobile phones", USENIX Security Symposium 2012.
Ahmed et al., "A New Biometric Technology Based on Mouse Dynamics", Jul.-Sep. 2007, IEEE Transactions on Dependable and Secure Computing, vol. 4, No. 3, pp. 165-179.
Bailey, Kyle O., "Computer Based Behavioral Biometric Authentication via Multi-Modal Fusion", Thesis, 2013, Air Force Insitute of Technology.
Elizabeth Stinson and John C. Mitchell, "Characterizing the Remote Control Behavior of Bots", Detection of Intrusions and Malware, and Vulnerability Assessment. Springer Berlin Heidelberg, p. 89-108. Dec. 31, 2007.
Todorov, "Optimality Principles in Sensorimotor Control (Review)", Sep. 2004, Nature Neuroscience 7, pp. 907-915.
Cleeff et al., "Security Implications of Virtualization: A Literature Study", Science and Engineering, 2009.
Hibbeln et al., "Detecting Deception in Online Environments: Measuring Fraud Through Mouse Cursor Movements", Jun. 7, 2014, Gmunden Retreat on NeuroIS 2014 Gmunden Austria, p. 38.
Ferrie Peter, "Attack on Virtual Machine Emulators", Symantec Technology Exchange, 2007.
Yampolskiy et al., "Behavioural Biometrics: a survey and classification", 2008, International Journal of Biometrics, vol. 1, No. 1, pp. 81-113.
Provos et al., 2007, "The Ghost in the Browser: Analysis of Web-based Malware".
Huang Yao-Wen et al., "Web application security assessment by fault injection and behavior monitoring", 2003, Proceedings of the 12th international conference on World Wide Web, ACM.
Ben Hansen, "The Blur Busters Mouse Guide", dated Feb. 1, 2014; printed from the Internet on Aug. 5, 2019 from: https://www.blurbusters.com/faq/mouse-guide/.
Chris Cain, "Analyzing Man-in-the-Browser (MITB) Attacks", dated Dec. 2014; downloaded from the Internet on Aug. 5, 2019 from: https://www.sans.org/reading-room/whitepapers/forensics/analyzing-man-in-the-browser-mitb-attacks-35687.

* cited by examiner

SYSTEM, DEVICE, AND METHOD OF GENERATING AND UTILIZING ONE-TIME PASSWORDS

FIELD

Some embodiments are related to the field of computerized systems.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

SUMMARY

Some embodiments include devices, systems, and methods of generating and utilizing One-Time Passwords (OTPs), or One-Time Personal Identification Number (One-Time PIN, or OTP).

For example, a user of an electronic device may log-in to a computerized service, via a website or a mobile application or "app", by entering his username and regular password. For security reasons, the server of the computerized service may require the user to receive an email message or an SMS text message that contains an OTP that is generated by the server, and to enter that OTP into the interface into that website or app. Conventional systems generate the OTP randomly or pseudo-randomly; for example, as a purely random string of 6 digits, or as a purely random string of 6 alpha-numeric characters. In contrast, some embodiments of the present invention generate the OTP in a deterministic manner and/or by using a deterministic pattern, that is not purely or entirely random or pseudo-random; but rather, in a manner that enables the server to select an OTP that— when entered by the user via typing—would enable a user interactions monitoring and analysis unit to efficiently and reliably extract behavioral typing characteristics of the user from the manner in which the user types the OTP. Accordingly, for example, instead of generating pseudo-randomly an OTP string (such as "283719"), the server in some embodiments may intentionally and deterministically generate a particular OTP string having a particular internal structure or internal patter, such as (for example) "135246" or "369222" or "543987"; and such particular OTP values may allow the system to efficiently and reliably extract useful and reliable behavioral typing characteristics of the user, from the manner that the user types or enters characters that have a particular visible pattern, and/or that have an in-keyboard location pattern (e.g., keyboard keys proximity, such as the substring "ASD") and/or that have a particular in-keypad location pattern (e.g., keypad keys proximity, such as "258"). Such extraction is enabled by generating and utilizing these or other unique, deterministic, patterned, non-random OTP strings, instead of generating and utilizing purely-random and behaviorally-agnostic OTP strings. Similarly, some embodiments may generate and utilize an OTP that includes a repeating character and/or a dictionary word, such as "AAAdog" or "BBBhello", which may similarly allow the system to extract reliable and accurate behavioral insights and user-specific characteristics, instead of generating and utilizing a purely-random OTP string such as "XRNPGQ".

Some embodiments may provide other and/or additional benefits or advantages.

DETAILED DESCRIPTION OF SOME DEMONSTRATIVE EMBODIMENTS

Figure 1:
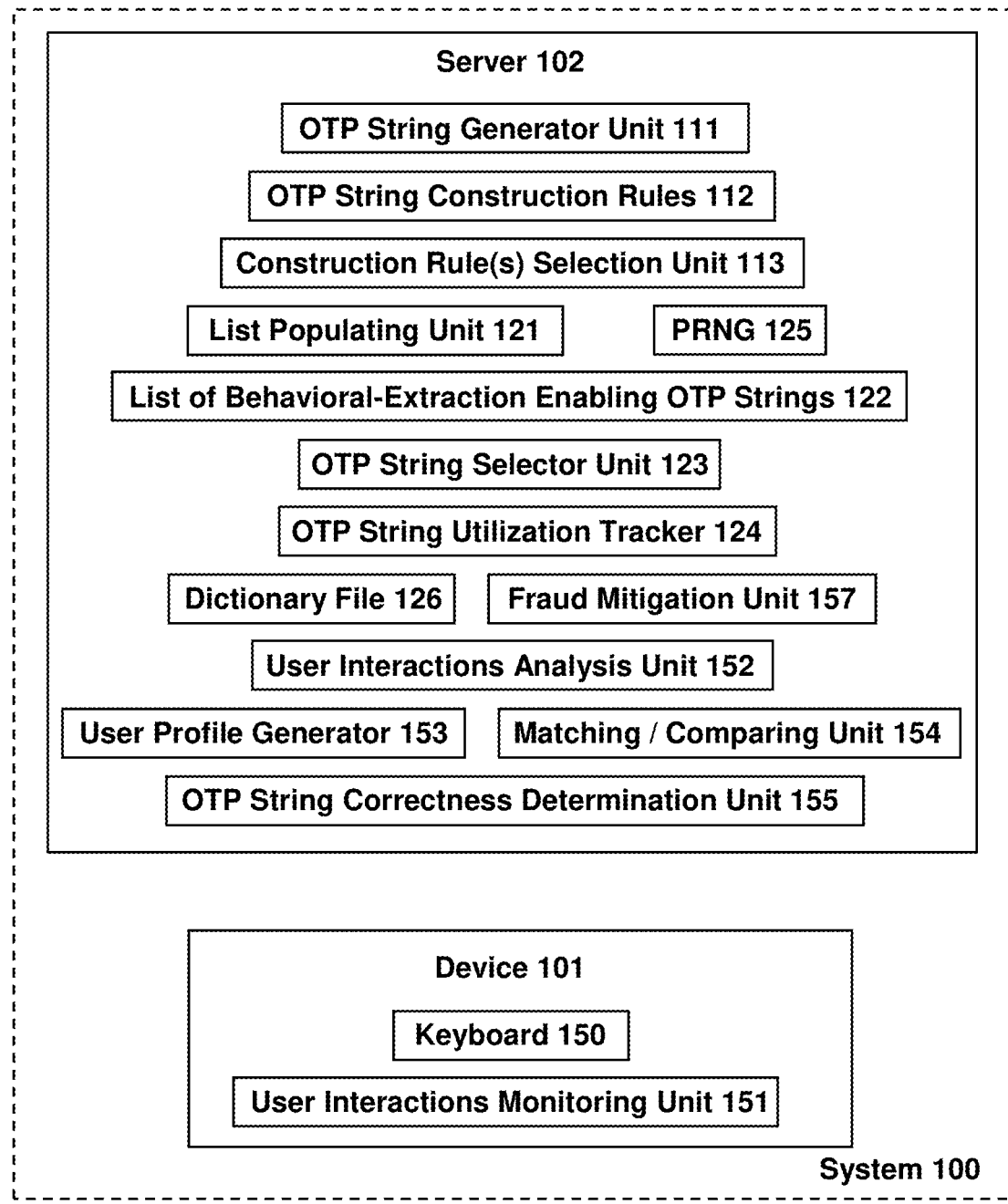
FIG. 1 is a schematic block-diagram illustration of a system, in accordance with some demonstrative embodiments of the present invention.

The Applicants have realized conventional systems utilize a randomly-generated One-Time Password (OTP), such as a random string of 6 digits, often as a second step in a two-step authentication process; by sending such randomly-generated string via an email message to a pre-registered email address of an account owner, or by an SMS text message to a pre-registered telephone number of the account owner.

The Applicants have realized that utilization of such randomly-generated OTP strings does not provide a capability to extract user-specific behavioral traits, such as user-specific typing patterns or data-entry patterns or characteristics.

The Applicants have realized that it may be beneficial or advantageous to generate, in a deterministic manner, a particular OTP string or a particular type of OTP strings, which are more "behavioral analysis friendly" or which provide an improved capability to extract—from the manner in which the user types or enters such OTP—one or more user-specific behavioral traits, such as user-specific typing patterns or data-entry patterns or characteristics.

The Applicants have realized that utilization of a randomly-generated OTP may often result in a pseudo-random OTP string, such as "274195" or "XQFTJGRZ", which provide poor capability or reduced capability, or sometimes even no capability at all, to a behavioral analysis unit to extract useful and reliable user-specific behavioral traits or typing patterns from the manner in which such pseudo-random OTP was typed by the user.

In contrast, realized the Applicants, generation and utilization of a particular type or subset of OTP strings, which are "behavioral analysis friendly" or "behavioral analysis compatible" or "behavioral analysis supportive", does provide to such behavioral analysis unit a capability or an improved or enhanced capability to extract useful and reliable user-specific behavioral traits or typing patterns from the manner in which such OTP was typed by the user.

For example, realized the Applicants, generating and utilizing an OTP string of "BBBktw" may be advantageous in some embodiments, as it may enable a behavioral monitoring and analysis unit to monitor the manner in which the user types three consecutive and identical characters (the sub-string "BBB" in this example), and may enable the behavioral monitoring and analysis unit to compare between (a) the behavioral trait that was extracted from the typing of this sub-string and (b) a previously-extracted behavioral trait that was extracted for this account owner or for this user in a previous usage-session or was determined for him across several past usage sessions. For example, a user is logged in to a computerized system as Adam Smith, and is requested to type the OTP string "BBBktw"; and the behavioral monitoring and analysis unit detects that the current user types the sub-string "BBB" very slowly, with time-interval of 1.5 seconds between each "B" and the following "B"; whereas, in one or more past usage sessions, when the account-owner of this account of Adam Smith had typed three consecutive characters that are identical to each other (such as "AAA" or "WWW"), or had typed this particular sub-string ("BBB"), he had exhibited rapid data-entry of only 0.2 seconds between a pair of consecutive identical characters. The currently-detected time-interval, or speed, or delay, is different by at least N percent from a previously-observed or previously-extracted or previously-determined reference value that had been established for this particular user or account-owner (e.g., it as at least 50% greater, or is at least 40% smaller, or the like); and therefore, the behavioral monitoring and analysis unit may generate a determination or a notification that the current user is not the legitimate or true or authorized account owner or user.

In some embodiments, for example, the system may generate an OTP string such as "135246" or "975864", which includes two sub-strings of digits that have a fixed numerical difference, and which some users may type faster relative to an entirely-random OTP string; thereby enabling the behavioral monitoring and analysis unit to extract useful and reliable user-specific behavioral traits or typing traits from the manner in which the user has typed the OTP string during the current usage session.

In some embodiments, for example, the system may generate an OTP string such as "135GRC" or "864HWM", which includes at least one sub-string of digits that have a fixed numerical difference, and which some users may type faster relative to an entirely-random OTP string; thereby enabling the behavioral monitoring and analysis unit to extract useful and reliable user-specific behavioral traits or typing traits from the manner in which the user has typed the OTP string during the current usage session.

In some embodiments, for example, the system may generate an OTP string such as "135eee" or "ddd864", which includes at least one sub-string of digits that have a fixed numerical difference, and also one sub-string of three consecutive identical characters; which some users may type faster relative to an entirely-random OTP string; thereby enabling the behavioral monitoring and analysis unit to extract useful and reliable user-specific behavioral traits or typing traits from the manner in which the user has typed the OTP string during the current usage session.

In some embodiments, the generated OTP string may include two sub-strings, such as in the above-mentioned examples of "135eee" or "ddd864"; and the system may detect, for example, a first rapid typing-pattern of the first three characters of the OTP string, followed by a time delay, and then followed by a second rapid typing-pattern of the next three characters of the OTP string; thereby enabling the system to extract a fresh measurement of the current user's characteristics of typing a three-character sub-string of identical characters, and to compare it to historically-established values for that same user or for the account owner based on his past usage session(s).

In some embodiments, the generated OTP string may include 2 or 3 or 4 or 5 consecutive characters within the generated OTP string, which are immediately adjacent or immediately neighboring to each other in a series or in a row or in a pre-defined pattern on a computer keyboard or on a QWERTY keyboard; such as, an OTP string of "asdfBNM" which includes the substring "asdf" (four immediately-neighboring letters arranged in a row on a QWERTY keyboard) followed by the substring "BNM" (three immediately-neighboring letters arranged in a row on a QWERTY keyboard); or an OTP string of "erty777" which includes the substring "erty" (four immediately-neighboring letters arranged in a row on a QWERTY keyboard) followed by the substring "777" (three identical characters); or an OTP string of "QAZWSX" or "ZXCVASDF" which—although they appear entirely random—are actually two sets of substrings wherein each substring includes a row or a line or a diagonal or adjacent keys on a QWERTY keyboard; or other suitable OTP strings, enabling the system to extract a fresh measurement of the current user's characteristics of typing a such string or sub-string(s) thereof, and to compare it to historically-established values for that same user or for the account owner based on his past usage session(s).

In some embodiments, the generated OTP may include at least one word that appears in an English dictionary (or in another natural language, particularly the natural language that is currently used for the interface or content of the computerized system or website or application that are being used or accessed), or at least one popular and easily-spelled word in English (or in another natural language, particularly the natural language that is currently used for the interface or content of the computerized system or website or application that are being used or accessed), such as an OTP string of "DOG364" or "SLEEP47" or "68water"; thereby enabling the behavioral monitoring and analysis unit to extract useful and reliable user-specific behavioral traits or typing traits from the manner in which the user has typed the OTP string during the current usage session. In some embodiments, the OTP string may include (or, may consist of) two natural-language words, such as "DOGhorse" or "SPIDERcat" or "bighouse" or "smallpen"; as such particular type(s) of OTP strings may enable the behavioral monitoring and analysis unit to extract useful and reliable user-specific behavioral traits or typing traits from the manner in which the user has typed the OTP string during the current usage session.

Additionally or alternatively, in some situations, the behavioral monitoring and analysis unit may detect that the fresh typing pattern of a non-random OTP string, such as "AAA123" or "DogCat", exhibits a typing pattern that is entirely agnostic to the content or to the natural language meaning of the OTP string; such as, exhibits an entirely fixed typing speed or typing rhythm, which may characterize a "bot" or an automatic script or a malware that imitates the typing of a human user, rather than an actual human user.

In some embodiments, the freshly-extracted behavioral traits or typing traits, that are extracted from the manner in which the current user types the OTP string, may be compared not only to (or, not necessarily to) corresponding reference values that had already been measured and extracted from past usage session(s) for this user or for this account owner or for this account; but rather, they may be compared to reference values or to reference ranges-of-values that are pre-defined for an entirety of the population, or for a group or subset of the population of users, or to a particular group of users who share one or more particular traits (e.g., age, age-range, gender, profession, or the like). This may even allow the system to generate a possible-fraud alert with regard to a user who was never before seen by the system, or for a user that is currently performing his first-ever usage session or his first-ever engagement with the system, without relying on any past data of this particular user. For example, a user may fill an application to open a new bank account or a new credit card; and may indicate that he is a male, age 74 years old; may enter his email address or his phone number; and as part of the first-ever application process or account opening process, the system may send to his phone or to his email account an OTP string such as "BBBBgreat" or "13578642". The system may then detect that the user has typed the OTP string very rapidly, such as at a typing speed of 1 second for the entire OTP string; the system may utilize a pre-defined lookup table or rule, that indicates that for males in the age of 72 to 77, the average typing speed of an 8 to 10 characters string of familiar or somewhat-familiar text is not less than 3 seconds per such string; and therefore, without knowing any prior historical data about the typing speed or the typing patterns of this specific user, the system may determine that this is a possible-fraud attempt in which a young impostor (e.g., age 35) is pretending to be a senior citizen and attempts to fraudulently open a bank account or a new credit card with a stolen identity. It is noted that indeed, some older people type rapidly, and some younger people type slowly; however, extensive research performed by the Applicants, that included analysis of millions of usage-sessions, indicates that as a general rule, typing speed (or other particular typing traits) do have a certain rule-based correlation with age or gender or other user-specific traits, and they can be used efficiently and reliably for fraud detection or intrusion detection. Furthermore, it is noted that in the field of cyber security and fraud mitigation, no system is entirely perfect, and having "false positive" or "false negative" errors is an inherent part of virtually any security system; and therefore, the system is still useful and still provides utility even if, in some situations, it may generate a "false positive" error for a particular young user who types slowly, or a "false negative" error for a particular old user who types rapidly.

Reference is made to FIG. 1, which is a schematic block diagram illustration of a system 100, in accordance with some demonstrative embodiments. System 100 includes an electronic device 101 able to communicate (directly or indirectly) with a server 102; for example, to access a computerized service, to access a bank account or a brokerage account, to perform an online purchase or an online transaction, to obtain information from an online resource that requires logging-in, or the like.

For example, device 101 may be a smartphone, a tablet, a desktop computer, a laptop computer, a smart-watch, or other suitable device. Server 102 may be, for example, a web server, an application server, a database, a cloud computing server, a cloud based server, a remote server, a local server, an enterprise server, and organization server, or other suitable server. For example, server 102 may be a server of a bank or a banking entity or banking organization, the server of a financial institution such as a brokerage firm or a securities trading firm, a server of an online retailer or online vendor, the server of an Internet based service, a server of an online merchant or an E-commerce website, a server of a social network, a server of a streaming media service, a server of a database of information, or the like.

In some embodiments, server 102 may determine that it may be beneficial or may be required to request from the user of device 101 to perform a step (or, an additional step) of authentication or verification of his identity or his credentials, via a one-time password (OTP) string that is sent to the user and that the user is required to provide back to the system. For example the user of device 101 may be logging in into his bank account, or into his online account at an online merchant, via a new computer or via a new smartphone or via a new device that was not seen before by server 102 for this account or for this user, or from a new Internet Protocol (IP) address that was not seen before by server 102 for this account or for this user, or via a new web browser that was not seen before by server 102 as used for this account or for this user, or via a new application or "app" that was not used before by that user (e.g., via a native mobile "app", instead of through the mobile-friendly website). In other situations, the user is already logged in properly to his account, such as to his banking account or e-commerce account, but is requesting to perform a transaction that has certain characteristics or that meets certain pre-defined conditions or triggers; for example requesting to perform a wire transfer (and not just to check his balance), or requesting to perform a high-risk or a high-amount transaction, or requesting to perform a transaction of a wire transfer of funds to a new beneficiary or to a new payee or to a new recipient, or requesting to perform a wire transfer of funds in an amount that is greater than a pre-defined threshold amount, or requesting to perform an online purchase of an item that would be shipped to a new shipping address and/or to a new recipient, and/or performing or requesting other transaction that has one or more indicators of possible fraud or increased-risk or elevated-risk, or indicators that an increase level of security is required. In other situations, the requirement to use an OTP may be derived from the fact that this is a first-ever account setup or account registration of a new user that did not yet utilize that particular online service or online interface, and therefore it may be required to perform an OTP based authentication process with such new user in order to establish or to confirm that this new user indeed controls a particular email address and/or a particular phone number that he has provided as his contact details, and/or to otherwise confirm that the current user is indeed the actual legitimate owner of that account.

Once the server determines that a new OTP string is required, the server may initiate generation of an OTP string in a manner that is at least partially deterministic, or in a manner that is not entirely and completely random or pseudo-random; but rather, in accordance with OTP string generation rules that operate to ensure that the generated OTP string is "behavioral analysis friendly" or "behavioral analysis supportive" or is a "behavioral analysis enabling" OTP string.

In contrast with conventional systems, which randomly generate an OTP string of six or eight characters that are selected randomly or pseudo-randomly from a range of characters (e.g., six digits; or six alpha-numeric characters), some embodiments operate differently since the Applicants have realized that it may be beneficiary and advantages to generate and to utilize—and then to monitor and track the typing of—an OTP string that is not entirely random, and is not comprised of entirely randomly-selected characters or digits or letters, but rather is constructed in accordance with one or more pre-defined OTP string construction rules that result an OTP string that increases the capability of the system to extract one or more user-specific characteristics from the manner or the way in which the end-user types or enters or conveys that OTP string into his device or via input unit(s) of his device.

The Applicants have realized that instead of generating and sending, and then utilizing, an entirely random or pseudo-random OTP string such as the "XRTPBW", it may be more beneficial to generate particular strings as OTP strings and to utilize them for extracting user-specific behavioral typing patterns or data from the way that they are typed; for example, by generating an OTP string that includes 2 or 3 or 4 or 5 identical repeating letters (such as "YYYY47") or identical repeating digits (such as "GP4444") or identical repeating characters (such as "TXU@ @ @"), or an OTP string that includes characters that follow a particular pattern, for example, a substring of digits having a fixed numerical interval (such as "246"), and/or a substring that corresponds to a dictionary word in a natural language (such as "dog"), and/or a substring of keyboard-neighboring characters (such as "ASDF"), and/or other substrings that may be constructed in accordance with particular rules that are oriented to increase the utility of such string or substring for the purpose of extracting user-specific behavioral traits or typing traits from the manner in which the OTP string is typed.

The generated OTP string is then sent to the user via an email message or via an SMS text message. The user is then utilizes his device to type the OTP string and to submit it; and while the user is typing the OTP string via a physical keyboard or an on-screen keyboard, the user's device and/or the server and/or the system operate to monitor each and every keystroke and user gesture and user interaction, and to extract user-specific behavioral characteristics or typing characteristics from the monitored interactions. For example, the system may monitor and may analyze: key presses, key up gestures, key down gestures, key push, key release, and other key-related or typing-related gestures and their precise timing and time-length and time-intervals, to exact timing of each key-press and the exact time-length of each key-press; the time interval between key presses or between entering consecutive characters; the frequency or time-based characteristics; the time length of each key press or of the entire OTP string or of a particular portion or substring thereof; the average or the mean values of each one of the above-mentioned or below-mentioned parameters or monitored data items; the median value or the standard deviation value of each one of these parameters or monitored data items; the range of each of these parameters; the minimum and maximum values of each of these parameters; and/or any other parameters that are related directly or indirectly to the manner in which the user utilizes his keyboard or his physical keyboard or his on-screen keyboard in order to type or enter the OTP string that was provided to him. This may allow the system to extract user-specific characteristics from the manner in which the user typed or entered the OTP string. This fresh information characterizing the current user may then be compared, by the server 102 or (in some embodiments) by or within the device 101 itself, to previous or historic or past data about that specific user's characteristics of entering data.

For example, user Bob may currently exhibit a very slow manner of typing an OTP string that includes a familiar pattern of text (e.g., the OTP string is "345dog"); however, previous usage session(s) of the user who accessed the account of user Bob in the past, had indicated that this user (or this account owner) is typically a very fast rapid typist; and therefore a flag may be raised or an alarm notification may be triggered, indicating that this may not be the legitimate authorized user. In another example, user Carl is typing the OTP string very fast, but historical data showed that he has typically been a slow typist, and thus a fraud is estimated and a possible-fraud alert is triggered.

In another example, user David types the OTP string "great25" very slowly, whereas previous usage session(s) of that account owner had indicated that he types dictionary words rapidly. In another example, user David types the OTP string "135135" very rapidly, whereas previous usage session(s) of that account owner had indicated that he types numerical data slowly, even if the numerical data includes repeating digits or a pattern of digits (e.g., digits having a fixed numerical difference).

In another example, the user may be pushing or pressing the keys for a long time for each key entry in the OTP string typing, whereas previous data entry by the user of that account with regard to regular text (e.g., non-OTP text) had indicated a shorter period of time per keystroke or per key-down or key-up event.

Some embodiments therefore attempt to generate and to utilize, exclusively, only particular types of OTP strings that are constructed in accordance with pre-defined OTP construction rules that cause inclusion or generation of OTP strings that provide an increased or improved ability or capability of the system to extract from their typing manners one or more user-specific behavioral characteristics or typing characteristics; and to exclude from the pool or bank or set of available strings those that do not provide additional or extra benefit for extracting user characteristics or user-specific behavior from the manner in which such strings are typed, or that provide a poor or a reduced capability to enable extraction of user-specific behavioral characteristics or typing characteristics.

In some embodiment the OTP string is generated by pseudo-randomly or randomly selecting an OTP string from a predefined or pre-prepared list or pool or bank of OTP strings that were already constructed in accordance with said OTP string constructions rules, wherein each one of those predefined OTP strings on that list or in that pool is an OTP string that was already predetermined or pre-generated as being capable of providing enhanced extraction capability to extract from it user-specific behavioral typing patterns.

In some embodiments, a system administrator may indicate to the system requirements for the OTP string generation process; for example, a requirement to generate an OTP string of exactly N characters (e.g., exactly 6 or exactly 8 characters); or a requirement to utilize only a particular subset of characters (e.g., use only alphabet letters; or, use only upper-case alphabet letters; or, use only lower-case alphabet letters; or, use only digits; or, use only digits and upper-case letters; or the like); and the OTP string generation process may be dynamically configured to comply with such requirements.

In some embodiments, the OTP string intentionally comprises at least 2 or 3 or 4 or 5 consecutive characters that are identical to each other; or two or more sub strings that have such properties; for example, generating an OTP string of "AAA23RRR", or an OTP string of "BBBBeee", or an OTP string of "444www", or the like.

In some embodiments, a dictionary file or a dictionary list may be used, storing a list of several thousands of words or popular words in a particular natural language (e.g., English), and in some embodiments of the same natural language that is currently utilized by device 101 and/or that is used by the user interface that is currently presented to the current user; and the OTP string generation process may generate a string that necessarily includes at least one (or, exactly one) dictionary word or popular word or easily-spelled word, or that includes at least two (or, exactly two) such words; thereby generating an OTP string of, for example, "DOG468" or "CAT359", or an OTP string of "GoodFish" or "SweetCorn", or even an OTP of several such dictionary words or popular words or easily-spelled words (e.g., an OTP string of "CatDogBook", or "Red-BlueGreen"), or the like. In some embodiments, such file or list may include only words that are known or are pre-defined as easily-spelled words or as popular words (e.g., based on a list that ranks the most popular words in a particular language), and which excludes words that are typically hard or harder to spell correctly and/or words that users often make mistake in typing them; for example, including in such list popular words such as "house" and "book" and "great", and excluding from such list words such as "rhythm" or "chameleon".

The applicants have realized that some users type a familiar or popular word (e.g., "cat" or "dog" or "book" or "hello" or "dear") in a faster manner, or in accordance with a particular typing pattern or typing rhythm that is very user-specific (e.g., for the string "hello", typing a little slower the letters "he" and then typing faster the letters "llo"), based on user familiarity or user habits; thereby enabling the system to further authenticate the user based on this historical data of data entry or key presses.

In some embodiments the one-time password intentionally includes at least two or three characters that are immediately adjacent or neighboring to each other in a keyboard (e.g., in a standard QWERTY keyboard), or that are arrange in row or a column or a diagonal or a particular two-dimensional pattern on such keyboard; such as "ASDtcq"; and the system expects some users to type the first three characters ("ASD") faster relative to the next three characters ("tcq"); and the typing characteristics may be monitored and analyzed across usage sessions of that user to determine if the currently-exhibited typing pattern (during the typing of the OTP string) matches the previously-extracted typing pattern of that user or of that account-owner. In some embodiments, the system may already detect, optionally even in advance and prior to generating the OTP string for this use, that this same user had performed a wire transfer a week ago and had typed a free-text comment of "Wire for NASDAQ stock trading"; the system may detect that this free-text comment includes the substring "ASD" which is a series of three neighboring keys on a QWERTY keyboard; and the system may compare between (i) the behavioral manner or the typing characteristics of this user as he types now the substring "ADS" in the OTP string "ASDtcq", and (ii) the behavioral manner or the typing characteristics of this user as he typed the substring "ASD" in the comment "Wire for NASDAQ stock trading"; and the comparison result may be used for determining whether it is the same user or possibly a different user.

In another example, the OTP string generation process may intentionally include, or may intentionally comprise or utilize, at least a substring that had already been typed by the same user (or account-owner) in a past usage session. For example, user Adam performed in January a wire transfer to "John Brown", and typed a comment of "Payment for Blue Toyota car"; the system may search the past transaction or the recent transactions of user Adam, and may determine to generate now an OTP string that includes at least one of the words "Brown" and/or "Blue" and/or "Toyota"; since the system already knows one or more user-specific characteristics of how the user had typed this word or these words in the past, and can compare a freshly-monitored typing manner to the previously-extracted typing manner of these exact words for the same user or account-owner. Additionally or alternatively, in such situation, the system already knows that this particular user is expected to be familiar with at least some of these words, and would expect this particular user to type rapidly and/or correctly the substring "Toyota" in an OTP string that includes that substring; or, the system expects this user to not perform deletion operations during the typing of an OTP string that includes the word "Toyota" which the system already knows that the user is familiar with, and the detection of a deletion operation (e.g., delete or backspace) during OTP string entry may indicate possible fraud rather than an honest typographical error.

In some embodiments, there may be generated or pre-defined a list or a pool or a bank or a dataset or a database of OTP strings that are pre-generated in accordance with these rules, and that include specific structures that enable the system to extract more efficiently or more reliably one or more useful user-specific behavioral typing manners. In other embodiments, each OTP string is generated not by selecting from such pool of prepared OTP strings, but rather, by dynamically generating on-the-fly in real-time or near-real-time a fresh OTP string that adheres to one or more pre-defined OTP string constructions rules that enable it to provide an improved utility for extracting user-specific behavioral and typing characteristics from the manner in which such string is typed.

Some conventional systems generate an OTP string by selecting randomly from a particular certain subset of the alpha-numeric characters, for example, configured to select characters randomly from all the alpha-numeric characters except for the letter "O" and the digit "0" in order to avoid confusion between them, and in order to reduce or minimize user mistakes in reading the OTP string and/or in entering the OTP string. However, this is not at all similar to the manner in which some embodiments operate. Embodiments of the present invention do not merely attempt to generate OTP strings in a manner that reduces or minimizes user mistakes in understanding or reading or typing the OTP string. Rather, embodiments of the present invention operate to construct an OTP string in accordance with specific rules, which may include purely deterministic rules that also include a random or pseudo-random component in the selection process, that allows the system to generate an OTP string that is friendlier to, and more useful to, and more reliable for utilization by, a unit that monitors and analyzes the behavioral manner in which the user types such OTP string, and therefore provides to such unit a greater probability to reliably extract from the manner of typing such particular OTP string the one or more user-specific behavioral or typing characteristics which are then used for further authentication or verification of the user's identity.

Similarly, some conventional systems may generate an OTP string only from a limited subset of the alphanumeric range of characters, for example, only from the letters A through F, or only from the digits 1 through 9; but again, such conventional generation method has nothing to do with embodiments of the present invention, or with increasing the ability of a behavioral monitoring unit to extract user-specific characteristics from the manner in which the user later types the OTP string. The mere selection of OTP strings, in an entirely random manner, from a limited subset of the alpha-numeric range of characters, may possibly assist in reducing user confusion between similar characters (e.g., the letter "O" as in "Oscar", and the digit "0" which is zero; or, the lower-case letter "l" as in "letter", and the digit "1" which is one). Such conventional mechanism has nothing to do, again, with embodiments of the present invention which operate in accordance with particular OTP string construction rules that generate an OTP string that is friendlier towards, and is more supportive of, and is more compatible with and useful for, extraction of user-specific behavioral characteristics from the manner in which such OTP string is typed by a user.

In some embodiments, an OTP string may be generated in process that includes one or more deterministic rules, which also utilize at least one random or pseudo-random component or selection. For example, in some embodiments, an OTP string construction rule may be: randomly select a digit in the range of 1 to 9, and repeat it three times in a row; then, randomly select an upper-case letter, and repeat it four times in a row. Such OTP string construction rule operates to generate OTP strings in the range of "111AAAA" through "999ZZZZ"; and thus providing 9×26=234 permutations of an OTP string of this pattern that are useful for extraction of user-specific behavioral/typing characteristics.

In another example, an OTP string construction rule may be: randomly select three different words from a pre-defined list of 500 popular and easily-spelled dictionary words (e.g., "cat", "dog", "bird", "book", "door", "good", "hello", and so forth); thereby generating an OTP string such as "RedGreen-Hello" or "PinkHelloGood"; and thereby providing 500× 499×498=124,251,000 (over 124 million) permutations of an OTP string of this pattern that are useful for extraction of user-specific behavioral/typing characteristics. These examples demonstrate how some embodiments may efficiently combine one or more deterministic rules, with one or more random or pseudo-random selection operations, to provide the capability to generate millions of unique OTP strings that still provide sufficient entropy (e.g., are hard to guess by an attacker) yet also provide increased capability and utility for extraction of user-specific behavioral characteristics from the manner in which each OTP string is typed.

In some embodiments, the system may include an OTP string utilization tracking unit, to track the utilization of each OTP string for a particular user (or account), and/or across multiple accounts or all accounts (or, across multiple users or all users); for example, in order to track that the OTP string "RedGreenHouse" was already utilized for the account of User Adam in January, and therefore this same string should not be used for this same user in February, and optionally, such that this same string would not be used for any other user of the same service in the same month or in the same year, or the like; in order to increase entropy and to reduce the possibility for replay attacks.

In some embodiments, system 100 and/or device 101 and/or server 102 may comprise one or more, or some, or all, of the following components; which may be implemented as hardware components and/or software components.

An OTP String Generator Unit 111 operates to generate or construct an OTP string, in accordance with one or more OTP String Construction Rules 112 which may be pre-stored or pre-defined in a database or a list of rules.

Optionally, a Construction Rule(s) Selection Unit 113 may select one or more OTP String Construction Rules 112 that would be applied or deployed or activated for generating a particular OTP string for a particular user; optionally by taking into account data that is already known about this particular user. For example, a Database of User Profiles 114 may already store records that indicate, that user Adam is a rapid typist of popular English words, based on analysis of past usage sessions of user Adam; and therefore, the Construction Rule(s) Selection Unit 113 may select to utilize an OTP String Construction Rule that would construct, for user Adam, an OTP string that includes at least one popular English word (e.g., "Hello48"). In contrast, the Database of User Profiles 114 may already store records that indicate, that user Bob is a slow typist of consecutive identical characters based on analysis of past usage sessions of user Bob (e.g., Bob had exhibited slow typing in the past when he entered payment amounts of "222.99" dollars and "333.55" dollars); and therefore, the Construction Rule(s) Selection Unit 113 may select to utilize an OTP String Construction Rule that would construct, for user Bob, an OTP string that includes at least three repeating same-digit character (e.g., generating for Bob an OTP string of "dog999"). In some embodiments, two or more such rules may be selected, and they are then utilized by the OTP String Generator Unit 111 to generate the particular OTP string for this particular user and for this particular transaction.

In some embodiments, a List Populating Unit 121 may operate to generate a pre-defined list or bank or pool or dataset of pre-generated OTP strings that are constructed according to one or more of the OTP String Construction Rule and thus have increased or improved ability or utility for extraction of user-specific behavioral/typing characteristics from the manner in which they are typed, thereby generating a List of Behavioral-Extraction Enabling OTP Strings 122. Then, when a new OTP string is required for utilization, an OTP String Selector Unit 123 selects, randomly or pseudo-randomly, an OTP string from the List of Behavioral-Extraction Enabling OTP Strings 122. Optionally, an OTP String Utilization Tracker 124 may track which OTP strings on the list were already used, and/or by which users/accounts, and/or on which dates/times, and/or how many times in the past T days or months; and may operate to ensure that a particular OTP string is not re-utilized, at all, or more than N times, with regard to a particular user and/or particular account and/or a particular group of users (e.g., male users) for at least M days or months.

Optionally, a Pseudo-Random Number Generator (PNRG) 125 may be used to perform one or more of the random or pseudo-random selection operations that are described above and/or herein; such as, for pseudo-randomly selecting an OTP string from the List of Behavioral-Extraction Enabling OTP Strings 122; or for pseudo-randomly selecting a character or a digit or a letter that would be used by an OTP String Construction Rule to generate an OTP string; or for pseudo-randomly selecting a word or a substring from a Dictionary File 126 that stores natural language words (or a subset thereof; or a list of the N most-popular words in a natural language; or a list of the M most popular nouns in a natural language; or the like).

Server 102 then operates to construct a message, such as an electronic mail (email) message or an SMS text message, that includes the generated/the selected OTP string; and which may also include instructions of how or where to enter the OTP string, and/or a link or hyperlink that redirects the user's device to an OTP string entry page or interface. Server 102 then transmits or sends the message to the relevant email address or phone number.

The user receives the message through his device 101, opens the message, and clicks on the hyperlink or link to access the OTP string entry page or interface; or, utilizes another device which is already logged-in or is already accessing that relevant page; for example, the user logged-in to his bank account through his laptop computer; the OTP string was sent to the user's smartphone as an SMS text message; and the user will read the OTP string that he sees on his smartphone screen and will type it character-by-character into his laptop via the laptop keyboard; note that in this implementation, this user is not able to perform "copy and paste" of the OTP string from the smartphone's SMS text application to the laptop's interface, as these are two separate devices, thereby forcing the user to actually type the OTP string on his laptop's keyboard character by character, and thereby further enabling the monitoring of the typing and behavioral characteristics of the user's actions.

The device that the user is utilizing for the purpose of typing his OTP string, is equipped with a Keyboard 150 (e.g., a physical keyboard; or an on-screen keyboard that is accessible via a touch-screen), and also with a User Interactions Monitoring Unit 151: it monitors the keystrokes of the keyboard, and optionally it monitors also any other gestures or interactions by the user (e.g., mouse movements, mouse clicks, touch-pad gestures, or the like). For example, such monitoring may be implemented using JavaScript and/or HTML5 and/or CSS, or using an applet or a native "app" or a native application (e.g., an integral monitoring module that is implemented as part of a banking application or a retailer application), and/or using server-side script and/or client-side script, and/or using a component that is similar in its functionality to a keylogger unit; in order to monitor each keystroke or and/or user gesture and/or user interaction that the user performs via the keyboard and/or mouse and/or touchscreen and/or touch-pad and/or other input unit.

While the user is typing or interacting with his device, such code or script or monitoring unit may monitor and log every gesture and interaction made, together with its specific order and timing properties. A User Interactions Analysis Unit 152 may analyze those interactions and gestures and monitored data, and may extract user-specific patterns and/or user-specific behavioral characteristics and/or user-specific OTP-typing characteristics; such as, the average or the mean or the median or the standard deviation or the maximum value or the minimum value or the range (or other values) that are related to the timing of key presses, the time interval between key presses, the length or timing of key-down event or key-up event, the frequency of key presses, the delays or time gaps between keystrokes, the time-length of each keystroke, the time-length of typing the entire OTP string or of typing a particular substring thereof, whether there is a detected rhythm of faster typing of a certain word or substring, whether there is a detected rhythm of slower or delayed pauses between key presses or other time delays or pauses, characteristics of idleness time versus typing activity times, and/or other parameters These parameters may be monitored and recorded and analyzed with regard to the entry of the OTP string, and also with regard to the general interactions of the user with the same app or the same website or even with a different app or a different website.

For example, when user Jane is interacting on Monday with the banking website or app, or with the online e-commerce website or app, the system may monitor and track the manner in which user Jane is entering textual queries, search queries, textual comments, purchase orders or transactions, billing addresses, shipping addresses, beneficiary names, and/or other data. User-specific characteristics are extracted or detected or determined by the User Interactions Analysis Unit 152, and a User Profile Generator 153 operates to construct or generate a user profile for user Janet, which characterizes the manner in which she types data in general and/or on this particular website or application. Later, on Tuesday, user Janet attempts to login to her account from a new device (or IP address, or browser, or Operating System) that is not recognized by server 102 as already being associated with this user (e.g., such association may be tracked using a cookie file or a cookie data-item that a the server can write and read via a web browser); or, user Janet attempts to perform a transaction that is predefined as a high-risk or a higher-risk transaction. When user Janet types the OTP string, her interactions are monitored, and user-specific behavioral characteristics and typing characteristics are extracted, and are compared via a Matching/Comparing Unit 154 to those that were already stored in her user profile; thereby allowing the system to verify her identity (e.g., user is legitimate and authorized if a match is detected; user is non-authenticated or a possible-fraud alert is triggered if a match is not detected).

In some embodiments, optionally, or additionally or alternatively, the freshly-measured characteristics that were extracted from the fresh interactions and typing of the user while the user typed her OTP string, are compared to one or more reference values (or reference ranges-of-values) that are not necessarily of this particular user, but rather, that reflect an average or common or frequent characteristic of the general population of human users, or of a subset of the users (e.g., the average typing speed of males in the age-range of 70 to 80 years); and a non-match comparison result may trigger a possible-fraud alert.

On the server side, an OTP String Correctness Determination Unit 155 receives the string that was entered by the user and that was sent from the user's device to the server; and compares it to the OTP string that had been generated and sent to the user. For example, if the OTP string is "Hello57", and the user has entered and submitted "12345" or "Hello68", then the two strings are not identical to each other, and the system determines that this authentication has failed; and may perform one or more pre-defined operations (e.g., offer to perform a new authentication process, up to a pre-defined quota; or trigger one or more fraud-mitigation operations). In contrast, if the two strings match, then the server proceeds to determine whether the manner in which the user has just typed the OTP string, matches pervious behavioral/typing pattern(s) of data entry by that user, and/or matches behavioral/typing pattern(s) of data entry by a group of users to which this particular user belongs; and the comparison or matching result is used for user authentication or verification.

If the server detects or determines a difference or a non-match between (i) the fresh behavioral/typing pattern that is exhibited by the current user in typing the OTP string, and (ii) the reference values from historic usage of this specific user or the reference values of a population or users, then the system may determine that this is a possible-fraud situation or a possibly-fraudulent transaction, and not a legitimate user or not the authorized user. A Fraud Mitigation Unit 157 may operate to perform or to trigger or to activate one or more fraud mitigation operations or processes, in response to an estimate or a determination that the current user is not the authorized user or is not a legitimate user. For example an account or a transaction of the user may be blocked or may be frozen, or may be temporarily blocked or frozen; a transaction may be denied or rejected; access may be denied to a resource; the user may be logged out or logged off by the system; the user may be required to call by phone a customer service representative, or to perform authentication via a different device or mechanism, or to answer pre-defined security questions, or to visit a physical branch or store and speak to a human representative, or other suitable operations may be performed.

In some embodiments, the analysis of user interactions and user typing during the OTP string entry process, may include, for example: measuring the time duration between key-presses or keystrokes, or the time-interval between keystrokes; and extracting from the measured values, or determining or calculating from the measured values, the average or mean or media or standard deviation or range or maximum or minimum of the time-interval between keystrokes; and comparing the determined measurement to the reference measurement, of the same user and/or of a reference value of a group of users. In a first example, the OTP string is a patterned string of "AAAhouse"; and the system measures an average time-interval of 0.5 seconds between two consecutive keystrokes, or a maximum time-interval of 0.6 seconds between two consecutive keystrokes, or a minimum time-interval of 0.3 seconds between two consecutive keystrokes. The measured parameter(s) is compared against reference value(s) of corresponding parameters. For example, if the average time-interval of this same user, in his typing across several previous usage sessions (e.g., across 5 previous usage sessions, that were performed in the past 30 days), is an average time-interval of 0.53 seconds, then the measured value (0.50) and the reference value (0.53) are sufficiently close to each other (e.g., they are less than N percent different from each other, wherein N is a pre-defined threshold value; for example, N being 10 percent), and this measurement indicates that the current user is the legitimate user (or, that he is the same user as in previous usage sessions). In contrast, if the average value of the maximum time interval in past usage sessions is 1.4 seconds, then this value is not sufficiently similar to the currently-measured maximum value (0.6 seconds), and this deviation indicates that this is possibly not the same user as in previous usage sessions on this account. In some embodiments, the reference value may be based on a group of users having the same type or properties as those of the registered account owner or user; for example, the minimum time interval for females in the age-range of 70 to 80 years old, is 0.8 seconds; and therefore, the currently-measured average value of the minimum time interval of the current value (0.3 seconds) is not sufficiently close, thereby triggering a possible-fraud alert.

In some embodiments, the non-random, patterned, OTP string may comprise two or more portions, or substrings. In some embodiments, one of those substrings may be fixed and identical for all users of the computerized service, or for a group or type of users (e.g., for all males in the age range of 60 years or older). For example, all users of a service, or all users of a particular group of users, may be presented with an OTP string that beings with a fixed portion (e.g., "357") and then continues with another substring that is selected randomly or pseudo-randomly from a list of pre-defined suffix substrings (for example, from a list of "246", "680", "468", "357", and "579", in a demonstrative example). In some embodiments, the fixed portion or substring may be replaced (e.g., for all users, or for the group of users) every M minutes, for example, every hour or every day. In some embodiments, the patterning rule or the construction rule that generates the second, non-fixed, portion of the OTP string, may be replaced or changed every M minutes, for example, every hour or every day.

In some embodiments, the system may also take into account other measured parameters, as part of the process that determines whether the current user is indeed the authorized account owner; for example, the time-duration between (i) the time-point in which the user has placed the on-screen pointer of the interface's "focus" into the text field of the OTP entry, such as by clicking with a mouse or touch-pad on that field, and (ii) the time-point in which the user typed the first character of the OTP string. In other embodiments, the measured and utilized parameter may be, for example, the time duration between (i) the time-point in which the user typed the last character of the OTP string, and (ii) the time-point in which the user performed the "submit" operation of the OTP string (e.g., by pressing the Enter key, or by clicking on an on-screen Submit button).

The Applicants have performed research and experiments to verify that the above-mentioned methods are indeed useful, and indeed provide utility and benefit for the purpose of authenticating a user of a computerized system or service.

In a first experiment, a system was configured to monitor user interactions of two groups of users: (i) a first group of users (the control group), that were sent conventional OTP strings, each string being merely a conventional OTP that is entirely randomly generated; (ii) a second group of users (the test group), that were sent an OTP string that was not randomly generated but rather was generated by applying a deterministic OTP string construction rule (which may optionally include a random selection component) such that a non-random patterned OTP string is generated. Analysis of the results has indicated that a classifier unit, that classifies users as either belonging to the test group or to the test group, based on analysis of their monitored interactions, had an accuracy of over 67 percent; thereby shown that the two groups are indeed distinguishable.

In another experiment performed by the Applicant, a K-means clustering process was used for classification of data pertaining to user-interactions while typing OTP strings. For example, each OTP typing session in the experiment was classified or placed into one out of N pre-defined clusters or bins (for example, N=12, in one such experiment). Then, an analysis was performed in order to determine the probability that the same user would be classified (or placed) into the same cluster (or bin) in a subsequent OTP string typing session; optionally taking into account also the number of usage sessions that were tracked per user, and the number of clusters (bins) that they were classified into. The experiment and the analysis showed that the probability of OTP string typing sessions being classified into the same cluster (or bin) for the same user, was 38% for the control group (entirely random OTP strings), and was over 50% for the test group (patterned OTP strings); thereby indicating that the users in the test group exhibit more distinctive behavior and more user-characterizing behavior, during their OTP string typing activity, than users in the control group.

Figure 2A:
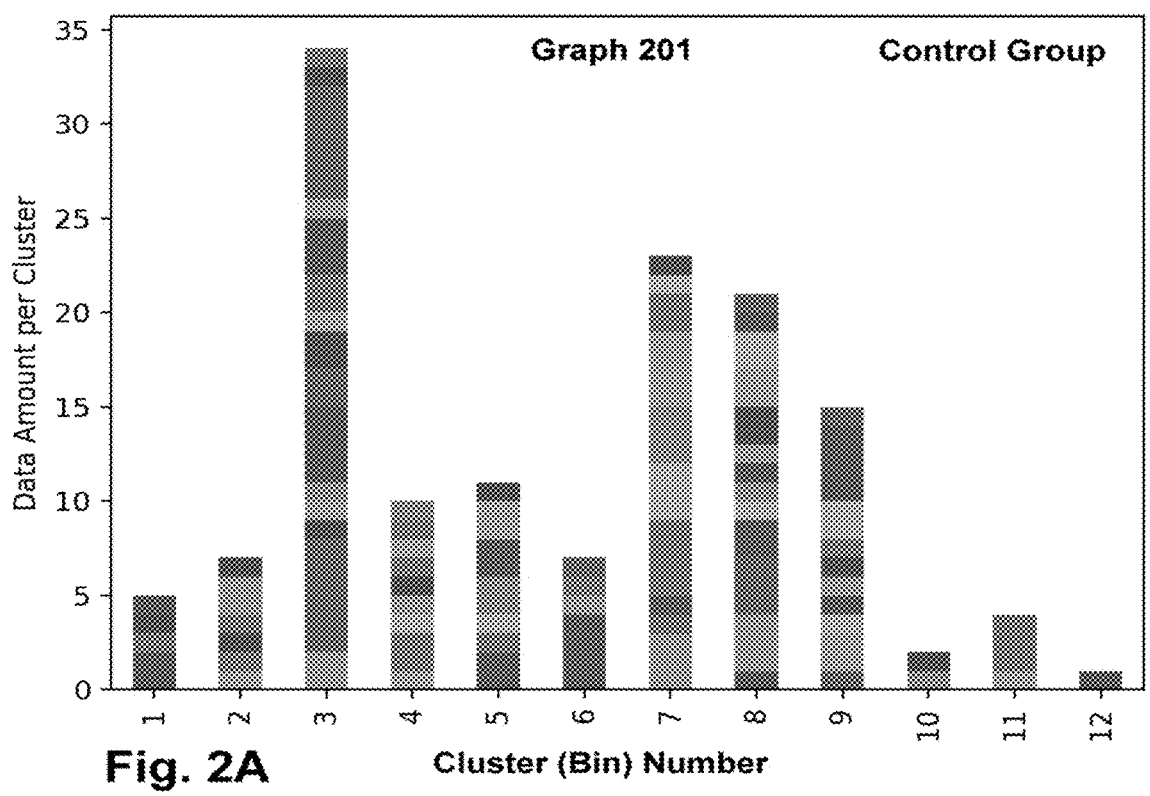
FIGS. 2A and 2B are graphs demonstrating clustering of data-points of a group of users into clusters or bins.
Figure 2B:
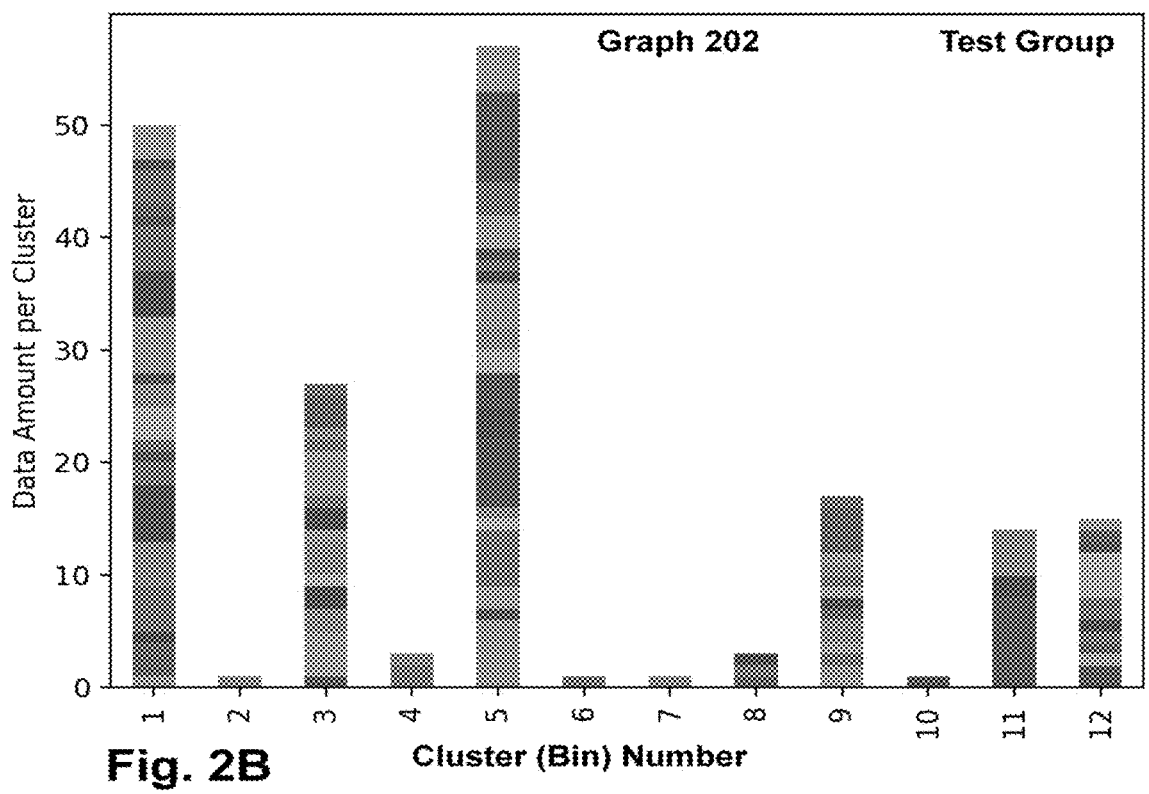

Reference is made to FIGS. 2A and 2B, which are graphs (201 and 202, respectively) demonstrating clustering of data-points of a group of users into clusters or "bins". FIG. 2A demonstrates clustering results of the Control Group of users, wherein each Control Group user has used only conventional, entirely random, non-patterned, OTP strings that lack any pattern or any deterministic structure. FIG. 2B demonstrates clustering results of the Test Group of users, wherein each Test Group user has used only patterned OTP strings that were generated in accordance with one or more deterministic construction rules in accordance with some embodiments of the present invention. The horizontal axis in each graph indicates the cluster number, from 1 to 12. The vertical axis in each graph indicates the cumulative amount of data-points that were classified into each cluster. Different colors or different shades of gray, within the same bar or across different bars, are data-points that originated from the same user; namely, each user is represented by a different color or a different shade. The contribution of each user to the number of sessions (data-points) in a cluster or bin, is represented by the length of the respective color (or shade) in the height of each bar. Over 130 data-points were used for each one of the groups (the Control group and the Test group). Each data-point corresponds to one session of OTP string entry. It may be observed that the clustering in the Test group is more concise and focused, as most data-points were classified into six particular clusters (out of the twelve available clusters); whereas, the clustering in the Control group shows clustering into 9 or 10 of the 12 available clusters. The data-points in the Test group clearly span fewer clusters (or bins), on average, relative to the Control group.

Figure 2C:
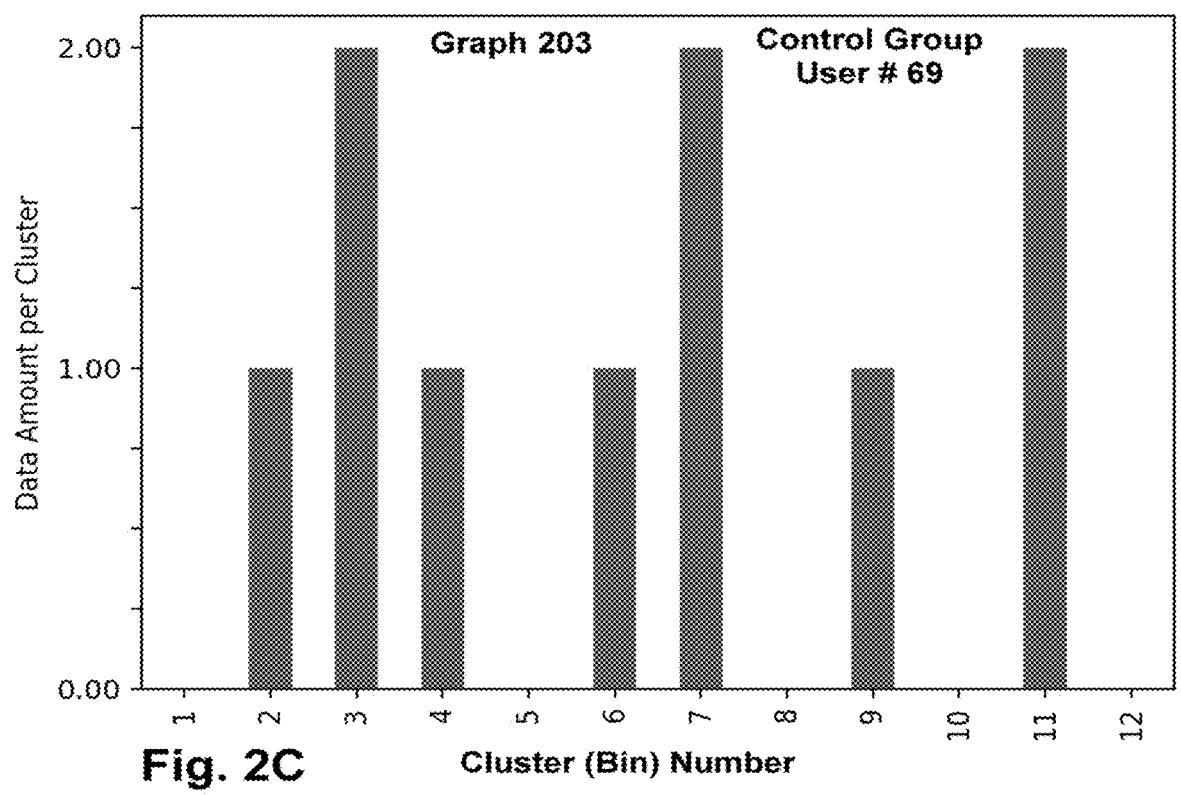
FIGS. 2C and 2D are graphs demonstrating user-specific data-points of a specific user, being clustered into clusters or bins.
Figure 2D:
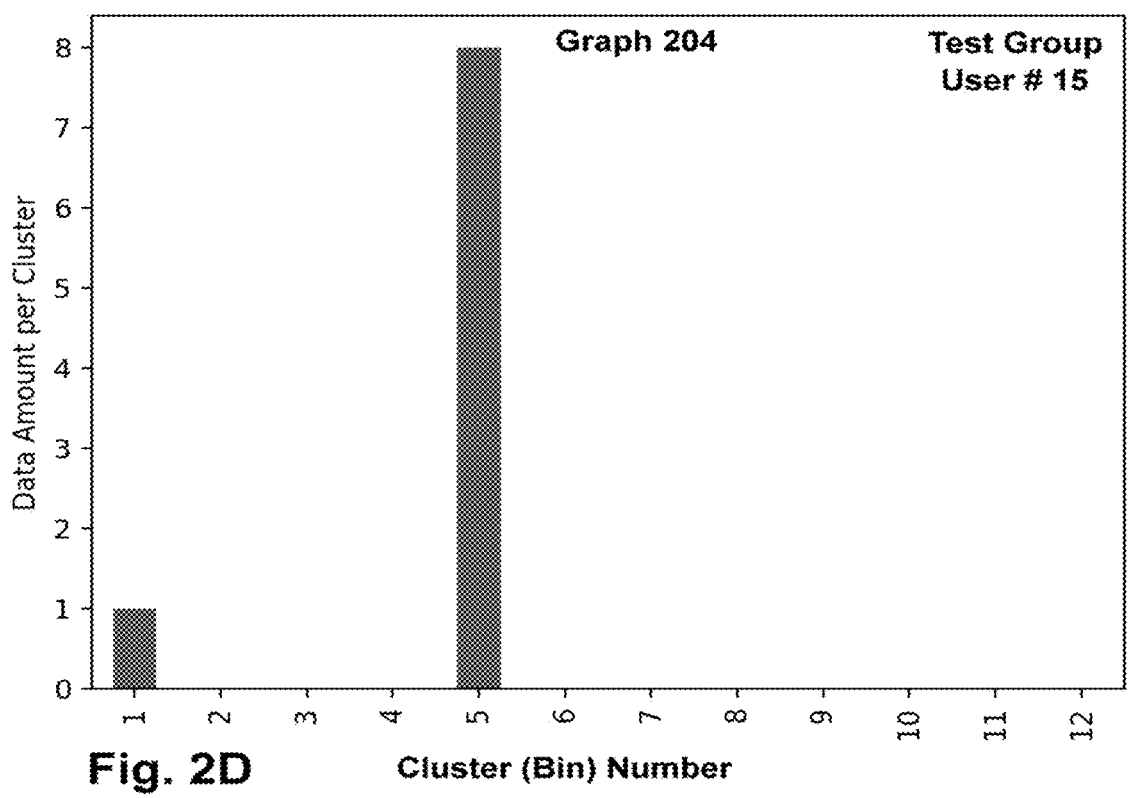

Reference is made to FIGS. 2C and 2D, which are graphs (203 and 204, respectively) demonstrating user-specific data-points being clustered into clusters or "bins". FIG. 2C demonstrates that a total of 10 data-points were collected from random non-patterned OTP string entries performed by a particular user (#69) in the Control Group; those 10 data-point were classified in a highly scattered and widely distributed manner, across Seven of the Twelve available clusters; with four clusters being populated by two data-points, and with three clusters being populated with a single data-point. In contrast, FIG. 2D demonstrates that a total of 9 data-points were collected from patterned OTP string entries performed by another particular user (#15) in the Test Group, and those 9 data-points of that Test Group user were classified or clustered into only Two out of the Twelve available clusters; with 8 out of the 9 data-points being classified into cluster number 5, and with 1 out of the 9 data-points being classified into cluster number 1. The Applicants have observed that OTP string entry sessions from Test Group users, tend to fit into a smaller or a significantly number of clusters or bins (e.g., only 2 out of 12 clusters, instead of 7 out of 12 clusters), relative to OTP entry sessions from the Control Group; and therefore, OTP string entries that are patterned and not entirely random provide a significantly improved and more reliable capability to differentiate among users based on the behavioral/typing manner in which they type an OTP string.

The graphs of FIGS. 2A to 2D demonstrate the utility of some embodiments to assist in user authentication and user identity verification and fraud mitigation. Furthermore, observing FIG. 2D and the two clusters therein: if a user's OTP entry sessions typically fall into just one or two clusters, and the system detects a fresh OTP entry session that falls into a different cluster, then this fresh OTP entry session may be immediately flagged as anomalous and possibly-fraudulent. Since the users in the Test Group generally fall into a smaller number of clusters than the users of the Control Group, the utilization of patterned OTP strings can more accurately detect anomalous data-point and thus fraudulent behavior.

One of several unique features of some embodiments is also, a system and method that operate to monitor user interactions and user behavior and user data-entry patterns during an OTP string entry session, which is typically very short-timed (e.g., only few seconds) and involved only typing of few (e.g., 6 or 8) characters; and extracting from this short-timed session a user-specific behavioral characteristic; and utilizing this particular characteristic to differentiate among users, or to determine whether a currently-monitored user is the authorized or legitimate user of an account, or to determine whether a currently-monitored user exhibits behavioral patterns during the OTP string entry that match or that are sufficiently similar (e.g., beyond a pre-defined threshold value of similarity) to previously-calculated behavioral/typing patterns of the registered account owner and/or of the user who is accessing this account and/or relative to one or more threshold values or threshold ranges-of-values of a group or population of users or a type of users (e.g., based on age, gender, and other parameters). This unique feature of some embodiments is counter-intuitive: conventional systems did not attempt to differentiate among users, or to authenticate or un-authenticate a user, based exclusively on the manner in which the user types a short (e.g., 6 or 8 character long) OTP string; since in conventional systems the OTP string was always purely random and could not have been utilized to provide behavioral insights in a predictable or reliable manner. In contrast, some embodiments of the present invention do enable a system to utilize the manner in which a user types or enters a single OTP string, exclusive by itself (and/or, optionally, in conjunction with other biometric or behavioral characteristics that may be extracted from other user interactions that were monitored prior to and/or subsequent to the OTP string entry), in order to differentiate among users and/or to authenticate a user.

Some embodiments include a non-transitory storage medium or storage article, having stored thereon instructions that, when executed by a processor, cause the processor to perform a method as described above.

Some embodiments may utilize and/or may comprise, one or more units, components, operations, methods, systems, processes, parameters, data-items, analysis units, analysis results, fraud detection units, fraud mitigation units, and/or other elements which are described in any of the following publications, all of which are hereby incorporated by reference in their entirety: United States patent application publication number US 2021/0014236 A1; United States patent application publication number US 2020/0273040 A1; United States patent application publication number US 2021/0051172 A1; United States patent application publication number US 2021/0110014 A1; United States patent application publication number US 2017/0140279 A1; U.S. Ser. No. 17/359,579 (filed on Jun. 27, 2021).

Some embodiments provide a method (e.g., a computerized method) comprising: (a) generating a particular one-time password (OTP) string that is based on one or more pre-defined OTP string construction rules; wherein the particular OTP string is not a purely-random string; wherein the particular OTP string provides to a behavioral monitoring unit a capability to extract user-specific behavioral typing patterns from a way in which a user types characters of said particular OTP via a keyboard of an electronic device; (b) sending said particular OTP string to a message-receiving device of said user, via an electronic message selected from the group consisting of: an electronic mail (email) message, a Short Message Service (SMS) text message; (c) monitoring user interactions of said user on said electronic device while said user enters data in response to a request to enter said particular OTP string; (d) extracting from said user interactions, that were performed while said user entered data in response to the request to enter said particular OTP string, a user-specific behavioral characteristic; (e) based on said user-specific behavioral characteristic, determining whether said user is authenticated or non-authenticated.

In some embodiments, the determining of step (e) comprises: determining whether said user is authenticated or non-authenticated, based on whether (I) a freshly-calculated value of said user-specific behavioral characteristic, that was derived from the way in which said user entered said particular OTP string, matches (II) a user-specific reference value that had previously been calculated for said user based on previous data entry of said user.

In some embodiments, the determining of step (e) comprises: determining whether said user is authenticated or non-authenticated, based on whether (I) a freshly-calculated value of said user-specific behavioral characteristic, that was derived from the way in which said user entered said particular OTP string, matches (II) a class-wide reference value that had previously been calculated for a group of users based on data entry previously performed by said user, wherein said group of users includes said user.

In some embodiments, the determining of step (e) comprises: determining whether said user is authenticated or non-authenticated, based on whether (I) a freshly-calculated value of said user-specific behavioral characteristic, that was derived from the way in which said user entered said particular OTP string, matches (II) a class-wide reference value that had previously been calculated for a group of users based on data entry previously performed by said user, wherein said group of users excludes said user.

In some embodiments, the determining of step (e) comprises: determining whether said user is authenticated or non-authenticated, based cumulatively on: (e1) whether (I) a freshly-calculated value of said user-specific behavioral characteristic, that was derived from the way in which said user entered said particular OTP string, matches (II) a previously-calculated reference value that had previously been calculated; and also, (e2) based on whether a fresh string that was entered by said user in response to the request to enter said particular OTP string, is identical to said particular OTP string.

In some embodiments, step (e) comprises: determining that said user is non-authenticated, even though the user entered correctly said particular OTP string in response to the request to enter said particular OTP string, based on a determination that a behavioral typing manner that was exhibited by the user during entry of the particular OTP string differs from a previously-detected behavioral typing manner that was previously determined with regard to said user.

In some embodiments, the generating of step (a) comprises: pseudo-randomly selecting an OTP string from a pre-defined list of pre-approved OTP strings; wherein each pre-approved OTP string in said list is an OTP string that is pre-determined as being capable of providing capability to extract user-specific behavioral typing patterns from the way in which users type characters of said pre-approved OTP string.

In some embodiments, generating said particular OTP string comprises: intentionally and deterministically generating an OTP string that includes at least two consecutive characters that are identical to each other.

In some embodiments, generating said particular OTP string comprises: intentionally and deterministically generating an OTP string that includes at least two consecutive characters that are a same alphabetic letter repeated two or more times.

In some embodiments, generating said particular OTP string comprises: intentionally and deterministically generating an OTP string that includes at least two consecutive characters that are a same alphabetic digit repeated two or more times.

In some embodiments, generating said particular OTP string comprises: intentionally and deterministically generating an OTP string that includes, anywhere in said OTP string, a substring of three characters that consists of a first digit, a second digit, and a third digit; wherein a numerical difference between the first digit and the second digit, is equal to a numerical difference between the second digit and the third digit.

In some embodiments, generating said particular OTP string comprises: intentionally and deterministically generating an OTP string that includes, anywhere in said OTP string, an entire word that appears in a pre-defined list of English words.

In some embodiments, the method comprises: determining which natural language is utilized by said user to interact with a particular computerized service; wherein generating said particular OTP string comprises: intentionally and deterministically generating an OTP string that includes, anywhere in said OTP string, an entire word that appears in a pre-defined list of words in said natural language.

In some embodiments, generating said particular OTP string comprises: intentionally and deterministically generating an OTP string that includes, anywhere in said OTP string, at least: a first character, followed immediately by a second character, followed immediately by a third character; wherein the second character is located, in a QWERTY keyboard, immediately neighboring to the first character and also immediately neighboring to the third character.

In some embodiments, generating said particular OTP string comprises: intentionally and deterministically generating an OTP string that includes, anywhere in said OTP string, a particular substring that had been previously typed by said user during a previous usage-session in which user typing was monitored for extraction of behavioral typing patterns.

In some embodiments, the monitoring of claim 1 comprises: monitoring user interactions of said user by monitoring at least one of: a physical keyboard of said electronic device, an on-screen keyboard of said electronic device.

In some embodiments, the sending of step (b) comprises: sending said particular OTP string to a smartphone of said user; wherein the monitoring of step (c) comprises: monitoring user interactions of said user while the said user enters said particular OTP string on said electronic device which is a device other than said smartphone of said user.

In some embodiments, the method comprises: if it is determined in step (e) that the user is non-authenticated, then: activating or applying or deploying or triggering or performing one or more pre-defined fraud mitigation operations or transaction blocking operations. In some embodiments, the method includes, for example, blocking or unauthorizing, at least temporarily, an online transaction that is requested via the end-user device, and/or blocking or denying access (at least temporarily) to an online account. entity. In some embodiments, fraud mitigation operations may be selected and enforced, for example, by the Fraud Mitigation Unit, which may select and enforce (or apply, or activate, or trigger, or execute) one or more pre-defined fraud mitigation operations, based on one or more pre-defined fraud mitigation rules or conditions, selected from a pool or set of pre-defined fraud mitigation operations; for example, placing a temporary freeze or hold on a requested transaction; blocking or denying the requested transaction; blocking or black-listing a payee; placing a temporary freeze or hold on an account (e.g., a bank account, a securities account, an online purchase account); requiring the acting user to perform two-step or two-factor or multiple-factor authentication using another means, or to re-authenticate via an additional authentication factor or method; requiring the acting user to contact a customer service representative or a fraud department, telephonically or even face-to-face at a branch; generating and sending notifications or alerts or inquiries, by email and/or by SMS text and/or by telephone and/or by other suitable methods, to one or more other persons or parties that are associated with the account (e.g., other signatories on the account), and/or sending to such additional person(s) a request for their additional approval; denying or un-authorizing access of entry to an online account; performing a forced log-off from an online account; and/or selecting and performing other suitable fraud mitigation operations.

Some embodiments include a non-transitory storage medium having stored thereon instructions that, when executed by one or more processors, cause the one or more processors to perform a method as described above and/or herein.

Some embodiments include a system comprising: one or more processors to execute code; wherein the one or more processors are operably associated with one or more memory units to store code; wherein the one or more processors are configured to perform a method as described above and/or herein.

Any reference above or herein to a parameter, typically indicated by a letter such as M or T or P or the like, may relate to a pre-defined or pre-configured parameter or constant or value or threshold value; or to a hard-coded value or constant; or, in some embodiments, to a user-configurable or administrator-configurable or programmer-configurable value or threshold value; or, in some embodiments, to a dynamically-configurable and/or automatically-modified value or threshold value, which may be modified or adjusted by the system automatically or autonomously if one or more pre-defined conditions hold true and/or based on one or more pre-defined threshold value modification rules which are enforced by a Parameters/Threshold Values Modification Unit or other suitable component. In some embodiments, for example, a threshold value may be automatically adjusted or modified, if the system generates possible-fraud alerts in a number that exceeds a pre-defined number per day or per hour (e.g., more than 50 possible-fraud alerts per hour); or conversely, if the system generates an excessively small number of possible-fraud alerts per da or per hour (e.g., less than 7 possible-fraud alerts per day); in order to adjust the system, in a dynamic manner, to a desired range of possible-fraud alerts that are generated per hour or per day or per time-unit.

It is noted that in accordance with the present invention, monitoring and/or analyzing of "user interactions" and/or "user gestures", may further comprise the monitoring and/or analyzing of interactions, gestures, and/or sensed data that is collected shortly before or immediately before the actual interaction, and/or interactions, gestures, and/or sensed data that is collected shortly after or immediately after the actual interaction; in addition to the data collected or sensed or monitored during the interaction itself; wherein "shortly" or "immediately" may be configured or may be pre-defined based on threshold values (e.g., within 0.5 seconds, within 1 second, or the like).

The terms "mobile device" or "mobile electronic device" as used herein may include, for example, a smartphone, a cellular phone, a mobile phone, a smart-watch, a tablet, a handheld device, a portable electronic device, a portable gaming device, a portable audio/video player, an Augmented Reality (AR) device or headset or gear, a Virtual Reality (VR) device or headset or gear, or the like.

The term "input unit" or "pointing device" as used herein may include, for example, a mouse, a trackball, a pointing stick, a stylus, a joystick, a motion-sensing input device, a touch screen, a touch-pad, or the like.

The terms "device" or "electronic device" as used herein may include, for example, a mobile device, a non-mobile device, a non-portable device, a desktop computer, a workstation, a computing terminal, a laptop computer, a notebook computer, a netbook computer, a computing device associated with a mouse or a similar pointing accessory, a smartphone, a tablet, a smart-watch, and/or other suitable machines or devices.

The term "genuine user" as used herein may include, for example, an owner of a device; a legal or lawful user of a device; an authorized user of a device; a person who has legal authorization and/or legal right to utilize a device, for general purpose(s) and/or for one or more particular purpose(s); or the person who had originally defined user credentials (e.g., username and password) for performing an activity through the device.

The term "fraudulent user" as used herein may include, for example, any person who is not the "genuine user" of the device; an attacker; an intruder; a man-in-the-middle attacker; a man-in-the-browser attacker; an unauthorized user; an impersonator; a hacker; a cracker; a person attempting to hack or crack or compromise a security measure utilized by the device or by a system or a service or a website, or utilized by an activity or service accessible through the device; a fraudster; a human fraudster; a "bot" or a malware or an automated computerized process (e.g., implemented by using software modules and/or hardware components) which attempts to imitate human behavior or which attempts to act as if such "bot" or malware or process was the genuine user; or the like.

The present invention may be used in conjunction with various suitable devices and systems, for example, various devices that have a touch-screen; an ATM; a kiosk machine or vending machine that has a touch-screen; a touch-keyboard; a system that utilizes Augmented Reality (AR) components or AR glasses (e.g., Google Glass RTM); a device or system that may detect hovering gestures that do not necessarily touch on the screen or touch-screen; a hovering screen; a system or device that utilize brainwave analysis or brainwave control in which the user's brainwaves are captured or read and the user's brain may directly control an application on the mobile device; and/or other suitable devices or systems.

Some embodiments may identify multiple (different) users that utilize the same device, or the same account, before or after a typical user profile is built, or even during a training period in which the system learns the behavioral patterns. This may be used for detection of "friendly fraud" incidents, or identification of users for accountability purposes, or identification of the user that utilized a particular function in an Administrator account (e.g., optionally used in conjunction with a requirement that certain users, or users with certain privileges, may not share their password or credentials with any other person); or identification of a licensee in order to detect or prevent software piracy or unauthorized usage by non-licensee user(s), for software or products that are sold or licensed on a per-user basis or a per-seat basis.

Some embodiments may be utilized to identify or detect a remote access attacker, or an attacker or a user that utilizes a remote access channel to access (or to attack, or to compromise) a computerized service, or an attacker or cyber-attacker or hacker or impostor or imposter or "fraudster" that poses as a genuine user or as a true owner of an account, or an automatic script or "bot" or malware. Some embodiments may be used to differentiate or distinguish among, for example, an authorized or legitimate or genuine or human user, as opposed to an illegitimate and/or unauthorized and/or impostor human attacker or human user, and/or as opposed to a "bot" or automatic script or automated script or automated program or malware.

Some embodiments may be utilized for authenticating, or confirming the identity of, a user who is already logged-in or signed-in; or conversely, a user that did not perform (or did not yet perform, or did not complete) a log-in or sign-in process; or a user that did not successfully perform a log-in or sign-in process; or a user who is interacting with a computerized service prior to signing-in or logging in (e.g., filling-out fields in an electronic commerce website as part of checking-out as a guest), or during a log-in process, or after a log-in process; or to confirm the identity of a user who is already-logged-in, or who is not-yet logged-in, or who operates a system or service that does not necessarily require or utilize a log-in process.

The terms "service" or "computerized service", as used herein, may be or may comprise any suitable service, or system, or device, which may require user authentication in order to authorize user access to it, or in order to authorize performance of one or more particular actions; including, but not limited to, for example, user authentication for accessing or operating or unlocking an electronic device (e.g., smartphone, tablet, smart-watch, laptop computer, desktop computer, smart-home device or appliance, Internet of Things (IoT) device) or service (e.g., banking service or website, brokerage service or website, email account, webmail, social network, online vendor, online merchant, electronic commerce website or application or "app"), or other system or platform that requires user authentication (e.g., entry into, or exit from, or passage through a gate or card-reader or turnstile; to unlock or open a device or a vehicle; to start or ignite a vehicle; to drive a vehicle).

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

The system(s) and/or device(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, accelerometer(s), gyroscope(s), compass unit(s), device orientation sensor(s), network elements (e.g., routers, switches, hubs, antennas), and/or other suitable components and/or modules.

The system(s) and/or devices of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL), BASIC, Visual BASIC, Matlab, Pascal, HTML, HTML5, CSS, Perl, Python, PHP, machine language, machine code, assembly language, or the like.

In some embodiments, a system or an apparatus may comprise at least one processor or that is communicatively coupled to a memory unit and configured to operate execute code, wherein the at least one processor is further configured to perform the operations and/or the functionalities describes above.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a legend list or a database of possible values or ranges; a comparison or matching or searching process which searches for matches and/or identical results and/or similar results among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A method comprising:
  (a) generating a particular one-time password (OTP) string that is based on one or more pre-defined OTP string construction rules,
  wherein the particular OTP string is not a purely-random string,
  wherein the particular OTP string provides to a behavioral monitoring unit a capability to extract user-specific behavioral typing patterns from a way in which a user types characters of said particular OTP via a keyboard of an electronic device;
  (b) sending said particular OTP string to a message-receiving device of said user, via an electronic message selected from the group consisting of: an electronic mail (email) message, a Short Message Service (SMS) text message;
  (c) monitoring user interactions of said user on said electronic device while said user enters data in response to a request to enter said particular OTP string;
  (d) extracting from said user interactions, that were performed while said user entered data in response to the request to enter said particular OTP string, a user-specific behavioral characteristic;
  (e) based on said user-specific behavioral characteristic, determining whether said user is authenticated or non-authenticated;
  wherein the determining of step (e) comprises:
  determining whether said user is authenticated or non-authenticated, based on whether (I) a freshly-calculated value of said user-specific behavioral characteristic, that was derived from the way in which said user entered said particular OTP string, matches (II) a class-wide reference value that had previously been calculated for a group of users based on data entry previously performed by said user, wherein said group of users includes said user.

2. The method of claim 1,
wherein the determining of step (e) comprises:
determining whether said user is authenticated or non-authenticated, based on whether (I) a freshly-calculated value of said user-specific behavioral characteristic, that was derived from the way in which said user entered said particular OTP string, matches (II) a user-specific reference value that had previously been calculated for said user based on previous data entry of said user.

3. The A method comprising: of claim 1,
(a) generating a particular one-time password (OTP) string that is based on one or more pre-defined OTP string construction rules,
wherein the particular OTP string is not a purely-random string,
wherein the particular OTP string provides to a behavioral monitoring unit a capability to extract user-specific behavioral typing patterns from a way in which a user types characters of said particular OTP via a keyboard of an electronic device;
(b) sending said particular OTP string to a message-receiving device of said user, via an electronic message selected from the group consisting of: an electronic mail (email) message, a Short Message Service (SMS) text message;
(c) monitoring user interactions of said user on said electronic device while said user enters data in response to a request to enter said particular OTP string;
(d) extracting from said user interactions, that were performed while said user entered data in response to the request to enter said particular OTP string, a user-specific behavioral characteristic;
(e) based on said user-specific behavioral characteristic, determining whether said user is authenticated or non-authenticated;
wherein the determining of step (e) comprises:
determining whether said user is authenticated or non-authenticated, based on whether (I) a freshly-calculated value of said user-specific behavioral characteristic, that was derived from the way in which said user entered said particular OTP string, matches (II) a class-wide reference value that had previously been calculated for a group of users based on data entry previously performed by said user, wherein said group of users excludes said user.

4. The method of claim 1,
wherein the determining of step (e) comprises:
determining whether said user is authenticated or non-authenticated,
based cumulatively on:
(e1) whether (I) a freshly-calculated value of said user-specific behavioral characteristic, that was derived from the way in which said user entered said particular OTP string, matches (II) a previously-calculated reference value that had previously been calculated;
and also,
(e2) based on whether a fresh string that was entered by said user in response to the request to enter said particular OTP string, is identical to said particular OTP string.

5. The method of claim 1,
wherein step (e) comprises:
determining that said user is non-authenticated, even though the user entered correctly said particular OTP string in response to the request to enter said particular OTP string, based on a determination that a behavioral typing manner that was exhibited by the user during entry of the particular OTP string differs from a previously-detected behavioral typing manner that was previously determined with regard to said user.

6. The method of claim 1,
wherein the generating of step (a) comprises:
pseudo-randomly selecting an OTP string from a pre-defined list of pre-approved OTP strings,
wherein each pre-approved OTP string in said list is an OTP string that is pre-determined as being capable of providing capability to extract user-specific behavioral typing patterns from the way in which users type characters of said pre-approved OTP string.

7. The method of claim 1,
wherein generating said particular OTP string comprises:
intentionally and deterministically generating an OTP string that includes at least two consecutive characters that are identical to each other.

8. The method of claim 1,
wherein generating said particular OTP string comprises:
intentionally and deterministically generating an OTP string that includes at least two consecutive characters that are a same alphabetic letter repeated two or more times.

9. The method of claim 1,
wherein generating said particular OTP string comprises:
intentionally and deterministically generating an OTP string that includes at least two consecutive characters that are a same alphabetic digit repeated two or more times.

10. The method of claim 1,
wherein generating said particular OTP string comprises:
intentionally and deterministically generating an OTP string that includes, anywhere in said OTP string, a substring of three characters that consists of a first digit, a second digit, and a third digit;
wherein a numerical difference between the first digit and the second digit, is equal to a numerical difference between the second digit and the third digit.

11. The method of claim 1,
wherein generating said particular OTP string comprises:
intentionally and deterministically generating an OTP string that includes, anywhere in said OTP string, an entire word that appears in a pre-defined list of English words.

12. The method of claim 1, comprising:
determining which natural language is utilized by said user to interact with a particular computerized service;
wherein generating said particular OTP string comprises:
intentionally and deterministically generating an OTP string that includes, anywhere in said OTP string, an entire word that appears in a pre-defined list of words in said natural language.

13. A method comprising:
(a) generating a particular one-time password (OTP) string that is based on one or more pre-defined OTP string construction rules,
wherein the particular OTP string is not a purely-random string,
wherein the particular OTP string provides to a behavioral monitoring unit a capability to extract user-specific behavioral typing patterns from a way in which a user types characters of said particular OTP via a keyboard of an electronic device;

(b) sending said particular OTP string to a message-receiving device of said user, via an electronic message selected from the group consisting of: an electronic mail (email) message, a Short Message Service (SMS) text message;
(c) monitoring user interactions of said user on said electronic device while said user enters data in response to a request to enter said particular OTP string;
(d) extracting from said user interactions, that were performed while said user entered data in response to the request to enter said particular OTP string, a user-specific behavioral characteristic;
(e) based on said user-specific behavioral characteristic, determining whether said user is authenticated or non-authenticated;
wherein generating said particular OTP string comprises: intentionally and deterministically generating an OTP string that includes, anywhere in said OTP string, at least: a first character, followed immediately by a second character, followed immediately by a third character; wherein the second character is located, in a QWERTY keyboard, immediately neighboring to the first character and also immediately neighboring to the third character.

14. The method of claim 1,
wherein generating said particular OTP string comprises: intentionally and deterministically generating an OTP string that includes, anywhere in said OTP string, a particular substring that had been previously typed by said user during a previous usage-session in which user typing was monitored for extraction of behavioral typing patterns.

15. The method of claim 1,
wherein the monitoring of claim 1 comprises:
monitoring user interactions of said user by monitoring at least one of: a physical keyboard of said electronic device, an on-screen keyboard of said electronic device.

16. The method of claim 1,
wherein the sending of step (b) comprises: sending said particular OTP string to a smartphone of said user;
wherein the monitoring of step (c) comprises: monitoring user interactions of said user while the said user enters said particular OTP string on said electronic device which is a device other than said smartphone of said user.

17. The method of claim 1, further comprising:
if it is determined in step (e) that the user is non-authenticated, then: activating one or more pre-defined fraud mitigation operations or transaction blocking operations.

18. A system comprising:
one or more processors to execute code,
wherein the one or more processors are operably associated with one or more memory units to store code,
wherein the one or more processors are configured to perform:
(a) generating a particular one-time password (OTP) string that is based on one or more pre-defined OTP string construction rules,
wherein the particular OTP string is not a purely-random string,
wherein the particular OTP string provides to a behavioral monitoring unit a capability to extract user-specific behavioral typing patterns from a way in which a user types characters of said particular OTP via a keyboard of an electronic device;
(b) sending said particular OTP string to a message-receiving device of said user, via an electronic message selected from the group consisting of: an electronic mail (email) message, a Short Message Service (SMS) text message;
(c) monitoring user interactions of said user on said electronic device while said user enters data in response to a request to enter said particular OTP string;
(d) extracting from said user interactions, that were performed while said user entered data in response to the request to enter said particular OTP string, a user-specific behavioral characteristic;
(e) based on said user-specific behavioral characteristic, determining whether said user is authenticated or non-authenticated;
wherein the determining of step (e) comprises:
determining whether said user is authenticated or non-authenticated, based on whether (I) a freshly-calculated value of said user-specific behavioral characteristic, that was derived from the way in which said user entered said particular OTP string, matches (II) a class-wide reference value that had previously been calculated for a group of users based on data entry previously performed by said user, wherein said group of users includes said user.

19. A system comprising:
one or more processors to execute code,
wherein the one or more processors are operably associated with one or more memory units to store code,
wherein the one or more processors are configured to perform:
(a) generating a particular one-time password (OTP) string that is based on one or more pre-defined OTP string construction rules,
wherein the particular OTP string is not a purely-random string,
wherein the particular OTP string provides to a behavioral monitoring unit a capability to extract user-specific behavioral typing patterns from a way in which a user types characters of said particular OTP via a keyboard of an electronic device;
(b) sending said particular OTP string to a message-receiving device of said user, via an electronic message selected from the group consisting of: an electronic mail (email) message, a Short Message Service (SMS) text message;
(c) monitoring user interactions of said user on said electronic device while said user enters data in response to a request to enter said particular OTP string;
(d) extracting from said user interactions, that were performed while said user entered data in response to the request to enter said particular OTP string, a user-specific behavioral characteristic;
(e) based on said user-specific behavioral characteristic, determining whether said user is authenticated or non-authenticated;
wherein the determining of step (e) comprises:
determining whether said user is authenticated or non-authenticated, based on whether (I) a freshly-calculated value of said user-specific behavioral characteristic, that was derived from the way in which said user entered said particular OTP string, matches (II) a class-wide reference value that had previously been calculated for a group of users based on data entry previously performed by said user, wherein said group of users excludes said user.

20. A system comprising:
one or more processors to execute code,
wherein the one or more processors are operably associated with one or more memory units to store code,
wherein the one or more processors are configured to perform:
(a) generating a particular one-time password (OTP) string that is based on one or more pre-defined OTP string construction rules,
wherein the particular OTP string is not a purely-random string,
wherein the particular OTP string provides to a behavioral monitoring unit a capability to extract user-specific behavioral typing patterns from a way in which a user types characters of said particular OTP via a keyboard of an electronic device;
(b) sending said particular OTP string to a message-receiving device of said user, via an electronic message selected from the group consisting of: an electronic mail (email) message, a Short Message Service (SMS) text message;
(c) monitoring user interactions of said user on said electronic device while said user enters data in response to a request to enter said particular OTP string;
(d) extracting from said user interactions, that were performed while said user entered data in response to the request to enter said particular OTP string, a user-specific behavioral characteristic;
(e) based on said user-specific behavioral characteristic, determining whether said user is authenticated or non-authenticated;
wherein generating said particular OTP string comprises: intentionally and deterministically generating an OTP string that includes, anywhere in said OTP string, at least: a first character, followed immediately by a second character, followed immediately by a third character; wherein the second character is located, in a QWERTY keyboard, immediately neighboring to the first character and also immediately neighboring to the third character.

\* \* \* \* \*